US012491650B2

(12) United States Patent
Lichtblau

(10) Patent No.: US 12,491,650 B2
(45) Date of Patent: Dec. 9, 2025

(54) PROPRIOCEPTIVE SHAVER

(71) Applicant: CLJI WORLDWIDE, LLC, North Palm Beach, FL (US)

(72) Inventor: Craig H. Lichtblau, North Palm Beach, FL (US)

(73) Assignee: CLJI WORLDWIDE, LLC, Palm Beach Gardens, FL (US)

(*) Notice: Subject to any disclaimer, the term of this patent is extended or adjusted under 35 U.S.C. 154(b) by 0 days.

(21) Appl. No.: 18/394,650

(22) Filed: Dec. 22, 2023

(65) Prior Publication Data

US 2024/0157592 A1 May 16, 2024

Related U.S. Application Data

(63) Continuation-in-part of application No. 17/144,953, filed on Jan. 8, 2021, now Pat. No. 11,872,712.

(51) Int. Cl.
*B26B 21/52* (2006.01)
*B26B 21/22* (2006.01)
*B26B 21/40* (2006.01)

(52) U.S. Cl.
CPC .......... *B26B 21/522* (2013.01); *B26B 21/225* (2013.01); *B26B 21/52* (2013.01); *B26B 21/521* (2013.01); *B26B 21/4012* (2013.01)

(58) Field of Classification Search
CPC ..... B26B 21/22; B26B 21/40; B26B 21/4012; B26B 21/52; B26B 21/521–523; B26B 21/527
USPC ......................... 30/47–51, 526–536; D28/48
See application file for complete search history.

(56) References Cited

U.S. PATENT DOCUMENTS

| | | | |
|---|---|---|---|
| 971,772 | A | 10/1910 | Millar |
| 1,201,317 | A | 10/1916 | Lishawa |
| RE14,748 | E | 11/1919 | Goodwin |
| 1,350,227 | A | 8/1920 | Jones |

(Continued)

FOREIGN PATENT DOCUMENTS

| | | |
|---|---|---|
| DE | 102018105820 | 1/2019 |
| GB | 2590949 | 7/2021 |

(Continued)

OTHER PUBLICATIONS

Anonymous, "Back shaver, XPREEN adjustable telescopic back hair removal shaver, portable painless back hair trimmer professional body groomer for wet or dry trimmer kit", Internet article, https://www.walmart.com/ip/back-shaver-XPREEN-adjustable-telescopic-hair-removal-portable-painless-trimmer-professional-body-groomer-wet-dry-kit/229135451, Internet article retrieved Nov. 25, 2020. pp. 1-3, 12-13, (2020).

(Continued)

*Primary Examiner* — Jason Daniel Prone
(74) *Attorney, Agent, or Firm* — McHale & Slavin, P.A.

(57) ABSTRACT

A proprioceptive shaver for shaving/grooming intimate areas. The proprioceptive shaver for shaving one or more portions of a body includes a main body having a first end and a second opposing end, a user engagement member designed to provide multiple points of contact with a user's hand when in use, and a shaving assembly having a razor head having at least one or more cutting surfaces. The multiple points of contact may include areas at or near the metacarpophalangeal joint, proximal interphalangeal joint and distal inferior phalange of the user's hand.

20 Claims, 34 Drawing Sheets

(56) References Cited

U.S. PATENT DOCUMENTS

| | | | |
|---|---|---|---|
| 1,354,658 | A | 10/1920 | Kane |
| 1,460,139 | A | 6/1923 | Parker |
| 1,785,917 | A | 12/1930 | Schuster |
| 2,020,043 | A | 11/1935 | Taylor |
| 2,102,142 | A | 12/1937 | Burnett |
| 2,648,129 | A | 8/1953 | Streeter |
| 2,750,663 | A | 6/1956 | Coles |
| 2,848,806 | A | 8/1958 | Shintzler et al. |
| 3,045,342 | A | 7/1962 | Diehl |
| 3,372,481 | A | 3/1968 | Skinner |
| 4,238,882 | A | 12/1980 | Harrison, Sr. |
| 4,542,585 | A | 9/1985 | Ito et al. |
| 4,768,528 | A | 9/1988 | Steele, Jr. |
| D319,324 | S | 8/1991 | Wahl et al. |
| 6,029,356 | A | 2/2000 | Sprinkle |
| 6,079,758 | A | 6/2000 | Romero et al. |
| 6,092,288 | A | 7/2000 | Adachi |
| D431,095 | S | 9/2000 | Hyman |
| D484,769 | S | 1/2004 | Cheung |
| 6,895,639 | B1 | 5/2005 | Bayton |
| D612,540 | S | 3/2010 | Joslin |
| 7,805,845 | B2 | 10/2010 | Kludjian et al. |
| 7,805,846 | B2 | 10/2010 | Leventhal et al. |
| 8,141,258 | B1 | 3/2012 | Frisch et al. |
| D679,447 | S | 4/2013 | Colle |
| 8,726,528 | B2 | 5/2014 | Lyles |
| 8,732,966 | B2 | 5/2014 | Snow |
| 8,782,911 | B1 | 7/2014 | Greene |
| 8,839,521 | B2 | 9/2014 | Hazard |
| D776,876 | S | 1/2017 | Coviello |
| 9,713,879 | B2 | 7/2017 | Samuels et al. |
| 9,849,599 | B2 | 12/2017 | Gers-Barlag et al. |
| 10,011,029 | B2 | 7/2018 | Bellisario et al. |
| 10,052,774 | B2 | 8/2018 | Giannelli et al. |
| 10,137,585 | B2 | 11/2018 | Gonterman |
| 10,137,586 | B1 | 11/2018 | Strong |
| 10,449,683 | B2 | 10/2019 | Spencer et al. |
| 10,513,041 | B2 | 12/2019 | Greene |
| 10,800,057 | B1 | 10/2020 | Blake et al. |
| 11,241,805 | B2 * | 2/2022 | Grunbart ............... B26B 21/527 |
| D981,040 | S * | 3/2023 | Parry ............................ D28/46 |
| 11,641,962 | B1 | 5/2023 | Foxx |
| 11,872,712 | B2 * | 1/2024 | Lichtblau .............. B26B 21/521 |
| 11,878,437 | B1 * | 1/2024 | Baldwin ............... B26B 21/527 |
| 12,202,161 | B2 * | 1/2025 | Lumpkins ............. B26B 21/527 |
| 2003/0204958 | A1 | 11/2003 | Jewell |
| 2003/0208914 | A1 | 11/2003 | Ehrlich et al. |
| 2008/0110025 | A1 | 5/2008 | Bucalo |
| 2008/0172882 | A1 | 7/2008 | Eger |
| 2009/0100679 | A1 | 4/2009 | Casciaro et al. |
| 2011/0271534 | A1 | 11/2011 | Briganti |
| 2013/0255455 | A1 | 10/2013 | McCue |
| 2014/0290066 | A1 | 10/2014 | Woolfson et al. |
| 2015/0183119 | A1 | 7/2015 | Contaldi |
| 2015/0320172 | A1 | 11/2015 | Spencer et al. |
| 2015/0367522 | A1 | 12/2015 | Martin |
| 2016/0046027 | A1 | 2/2016 | Peverini |
| 2016/0193740 | A1 | 7/2016 | Phillips et al. |
| 2017/0043492 | A1 | 2/2017 | Robertson et al. |
| 2018/0009122 | A1 | 1/2018 | Bruce et al. |
| 2019/0126503 | A1 | 5/2019 | Greene |
| 2020/0223083 | A1 | 7/2020 | Grunbart |
| 2021/0339416 | A1 | 11/2021 | Kopelas et al. |
| 2023/0098412 | A1 | 3/2023 | Lumpkins |
| 2023/0415366 | A1 * | 12/2023 | Kilsby .................. B26B 21/527 |
| 2024/0042633 | A1 * | 2/2024 | Parry .................... B26B 21/521 |

FOREIGN PATENT DOCUMENTS

| | | | | | |
|---|---|---|---|---|---|
| JP | 7691723 | B2 | * | 6/2025 | ............. B26B 21/52 |
| NZ | 801611 | A | * | 5/2025 | ............. B26B 21/52 |
| TW | 202138144 | A | * | 10/2021 | ........... B26B 21/522 |
| WO | WO2012107713 | | | 8/2012 | |
| WO | WO2019093931 | | | 5/2019 | |
| WO | WO2022150145 | | | 7/2022 | |

OTHER PUBLICATIONS

Mse, M., "Introducing EvoShave", Internet article, https://melaniesfabfinds.co.uk/chocolate/introducing-evoshave/, pp. 1-6, (Dec. 2016).

Roblin, A., "Finger-worn razors", Internet article retrieved Nov. 20, 2020, https://www.trendhunter.com/trends/mini-shaver, pp. 1-6, (Nov. 2013).

* cited by examiner

PROPRIOCEPTIVE SHAVER

CROSS-REFERENCE TO RELATED APPLICATIONS

In accordance with 37 C.F.R. 1.76, a claim of priority is included in an Application Data Sheet filed concurrently herewith. Accordingly, the present invention claims priority as continuation-in-part of U.S. patent application Ser. No. 17/144,983, now U.S. Pat. No. 11,872,712, filed on Jan. 8, 2021; the contents of which are incorporated herein by reference.

FIELD OF THE INVENTION

The present invention is related to medical devices; to shaving devices for use in medical procedures; and more particularly, to a proprioceptive shaver for shaving intimate areas and designed to provide a safer intimate grooming experience in areas that are typically hard to shave safely.

BACKGROUND OF THE INVENTION

Use of shaving systems for removal of hair from a body is well Known in the art. Typical type razors include those described by: U.S. Pat. Nos. 10,513,041, 10,137,586, 10,137,585, 9,713,879, 8,726,528, 11,241,805, U.S. Publication No. 2014/0290066, WO Publication No, 2019/093931, or WO Publication No. 2012/107713.

Such devices, however, are not safe when used for grooming/shaving in areas that are typically hard to shave safely as they fail to provide the user the necessary or proper awareness of the position and movement of the parts of the body by means of sensory organs (proprioceptors) in the muscles and joints controlling the movement of the razor head.

SUMMARY OF THE INVENTION

The present invention relates to a shaving device, preferably for use in shaving intimate areas, configured to provide a safer intimate grooming experience in areas that are typically hard to shave safely. The proprioceptive shaver is configured to provide enhanced control of the razor blade as the razor blade is moved over or contacts an area of skin to be shaved or groomed. Use of the term "proprioceptive shaver" is based on the following. Applicant's shaving device is designed to utilize multiple points of contact with a user's hand, thus providing the user the necessary or proper awareness of the position and movement of the parts of the body by means of sensory organs (proprioceptors) in the muscles and joints controlling the movement of the razor head. This creates a unique and exquisite control of the razor blade being utilized to shave a body, particularly when shaving intimate parts of the body. The points of contact include, directly underneath the metacarpophalangeal joint of two fingers of the same hand, or the area just distal to the metacarpophalangeal joint and proximal to the proximal interphalangeal joint, or the distal inferior phalanges (fingertips) of the same two fingers on the same hand.

As a result, a unique leverage is created between the metacarpophalangeal joint and the distal two inferior phalanges (fingertips) on the same hand. This unique and exaggerated leverage creates an increased proprioception and awareness of the position and movement of the razor while it is being moved across intimate skin. This increased proprioception of the razor blades allows for a much safer intimate grooming experience in areas that are difficult to shave safely.

In an illustrative embodiment, a proprioceptive shaver for shaving one or more portions of a body may comprise a main body having a first end and a second opposing end; a user engagement member configured to provide, at multiple points, contact with a user's hand when in use; and a shaving assembly comprising a razor head having at least one or more cutting surfaces. The multiple points of contact may include areas at or near the metacarpophalangeal joint, proximal interphalangeal joint and distal inferior phalange of the user's hand.

In an illustrate example, the multiple points of contact may include an area directly underneath the metacarpophalangeal joint of two fingers of the same hand, an area just distal to the metacarpophalangeal joint and proximal to the proximal interphalangeal joint, distal inferior phalanges (fingertips) of the same two fingers on the same hand, all three contact points, or any combination thereof.

In an illustrate example, a proprioceptive shaver for shaving one or more portions of a body comprises:

a main body having a first end and a second, opposing end, and arranged in a perpendicular orientation relative to a user engagement member;

said user engagement member comprising a first opening constructed and arranged to receive a first finger of a user's hand and a second opening constructed and arranged to receive a second finger, said first opening having a center axis that is parallel to a longitudinal axis of said main body, said second opening having a center that is parallel to said main body longitudinal axis, said first opening and said second opening constructed and arranged for height adjustment; and a shaving assembly extending from said main body and comprising a non-cutting surface for engaging ends of said first finger and said second finger when said fingers are in said openings thereby providing points of contact with the said user's hand and one or more cutting surfaces, said shaving assembly length extending from said main body being adjustable; and a leverage bar extending from said main body, said leverage bar for engaging said user's hand when said fingers are in said openings thereby providing points of contact with the said user's hand;

wherein, when placed on said user's hand, said proprioceptive shaver provides multiple points of contact with said user's hand.

In an alternative embodiment, a proprioceptive shaver for shaving one or more portions of a body comprises:

a user engagement member comprising a first opening and a second opening, said user engagement member constructed and arranged for height adjustment;

a main body extending in a perpendicular direction from said user engagement member, and having a first end, a second, opposing end, and an interior passageway, said main body having a longitudinal axis arranged in a parallel orientation relative to a center axis of said first opening and a center axis of said second opening;

a shaving assembly comprising an elongated shaft terminating in a non-cutting surface for engaging ends of said first finger and said second finger when said fingers are in said openings, said elongated shaft inserted within said interior passageway, with said non-cutting surface extending out from said interior passageway to allow a distal inferior phalange of a first finger of a user's hand and a distal inferior phalange of a second finger of said user's hand to rest on said non-cutting surface when in use; and a leverage body positioned at a distance from said main body, said leverage body positioned in an opposite direction as said main body relative to said user engagement member, said leverage bar for engaging said user's hand when said fingers are in said openings;

wherein, when placed on said user's hand wherein said user's first finger is inserted within said first opening and a distal inferior phalange of said first finger rests on said non-cutting surface and said user's second finger is inserted within said second opening and a distal inferior phalange of said second finger rests on said non-cutting surface, said proprioceptive shaver simultaneously contacts multiple areas of said user's hand.

The proprioceptive shaver for shaving one or more portions of a body may further comprise a shaving cartridge having at least one cutting surface.

Accordingly, it is an objective of the invention to provide an improved shaving device.

It is a further objective of the invention to provide a shaving device configured to provide a safer intimate grooming experience in areas that are typically hard to shave safely.

It is yet another objective of the invention to provide a proprioceptive shaver for shaving intimate areas.

It is a still further objective of the invention to provide a proprioceptive shaver for shaving intimate areas, such as the human genitalia, and/or the surrounding area.

It is a further objective of the invention to provide a proprioceptive shaver for shaving intimate areas which provides a user three points of contact on two fingers of the same hand.

It is yet another objective of the invention to provide a proprioceptive shaver for shaving intimate areas which is configured to provide unique leverage and balance, allowing for control of the razor blade during shaving of intimate parts of the body.

It is a still further objective of the invention to provide a proprioceptive shaver for shaving intimate areas which is configured to provide a user with increased awareness of the position and movements of the razor as it is moved across the skin or shaving area.

It is a further objective of the invention to provide a proprioceptive shaver for shaving intimate areas which is configured to provide a user with increase proprioception of the position and movements of the razor as it is moved across the skin or shaving area.

It is a further objective of the invention to provide a proprioceptive shaver for shaving intimate areas which is configured to provide a user with increased proprioception of the position and movements of the razor as it is moved across the skin or shaving area and includes vertical component height adjustment.

It is a further objective of the invention to provide a proprioceptive shaver for shaving intimate areas which is configured to provide a user with increased proprioception of the position and movements of the razor as it is moved across the skin or shaving area and includes horizontal component length adjustment.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
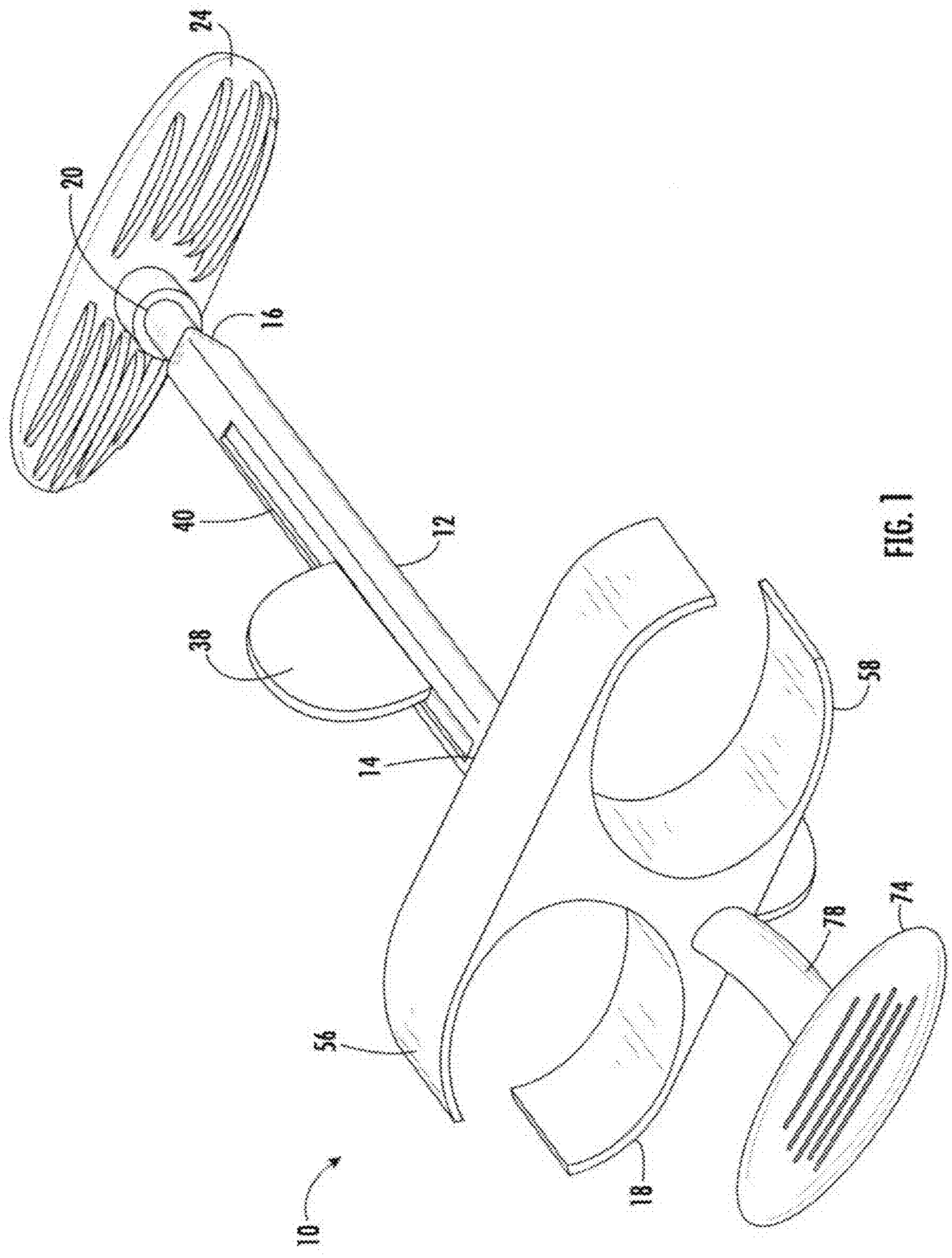
FIG. 1 is a prospective view of an illustrative embodiment of a proprioceptive shaver for shaving intimate areas.
Figure 2:
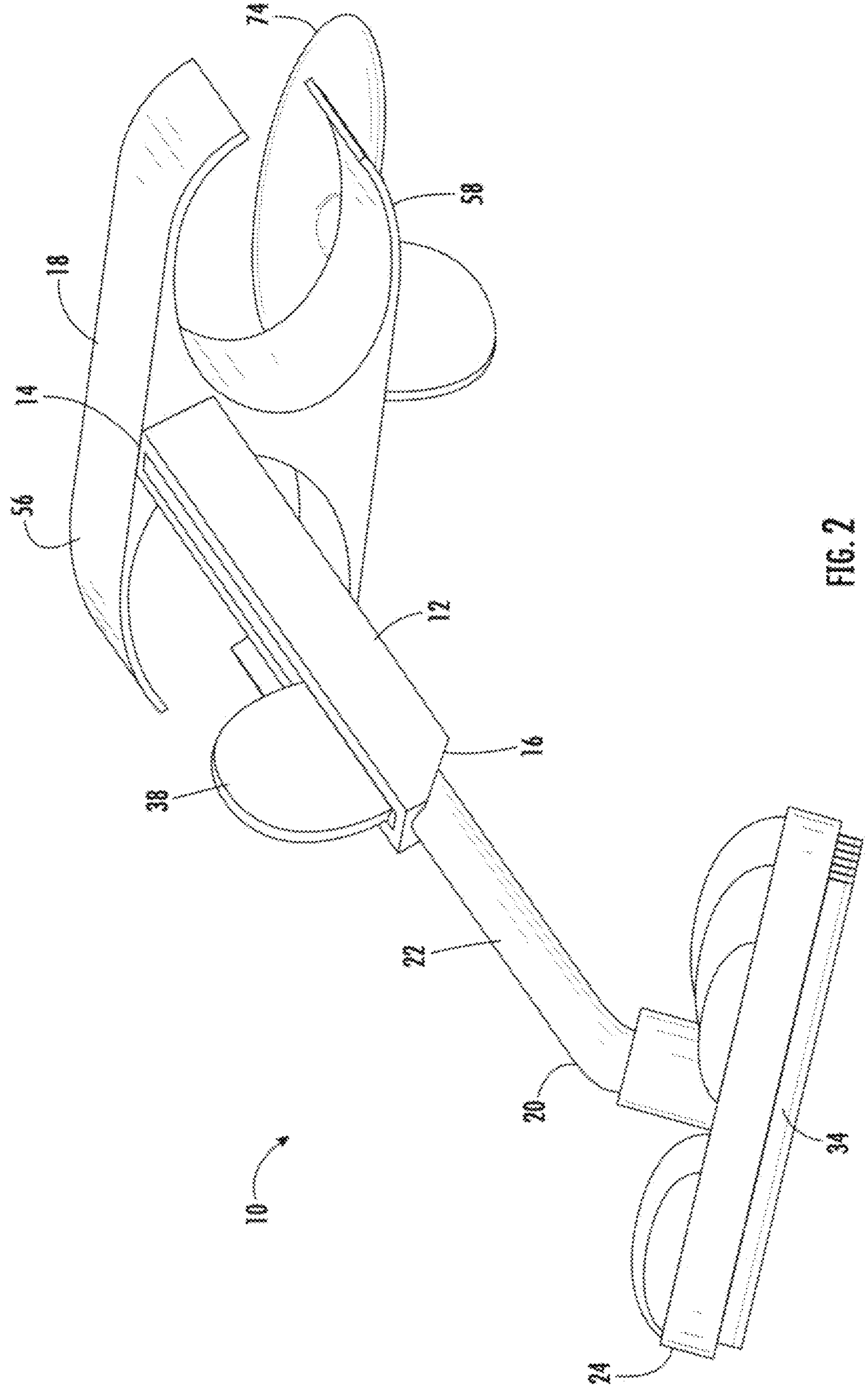
FIG. 2 is an alternative prospective view of the proprioceptive shaver for shaving intimate areas.
Figure 3:
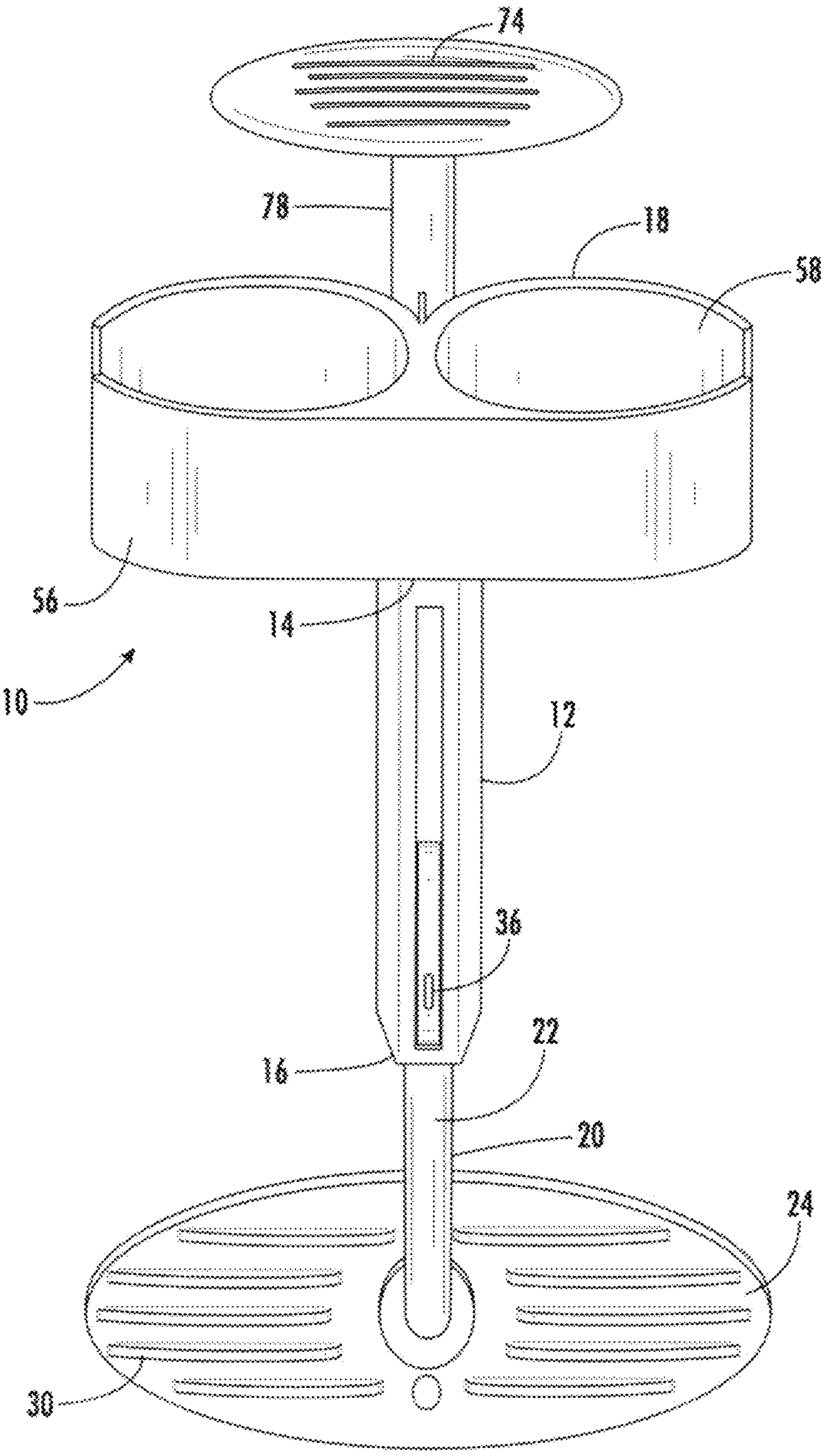
FIG. 3 is a top view of the proprioceptive shaver for shaving intimate areas.
Figure 4:
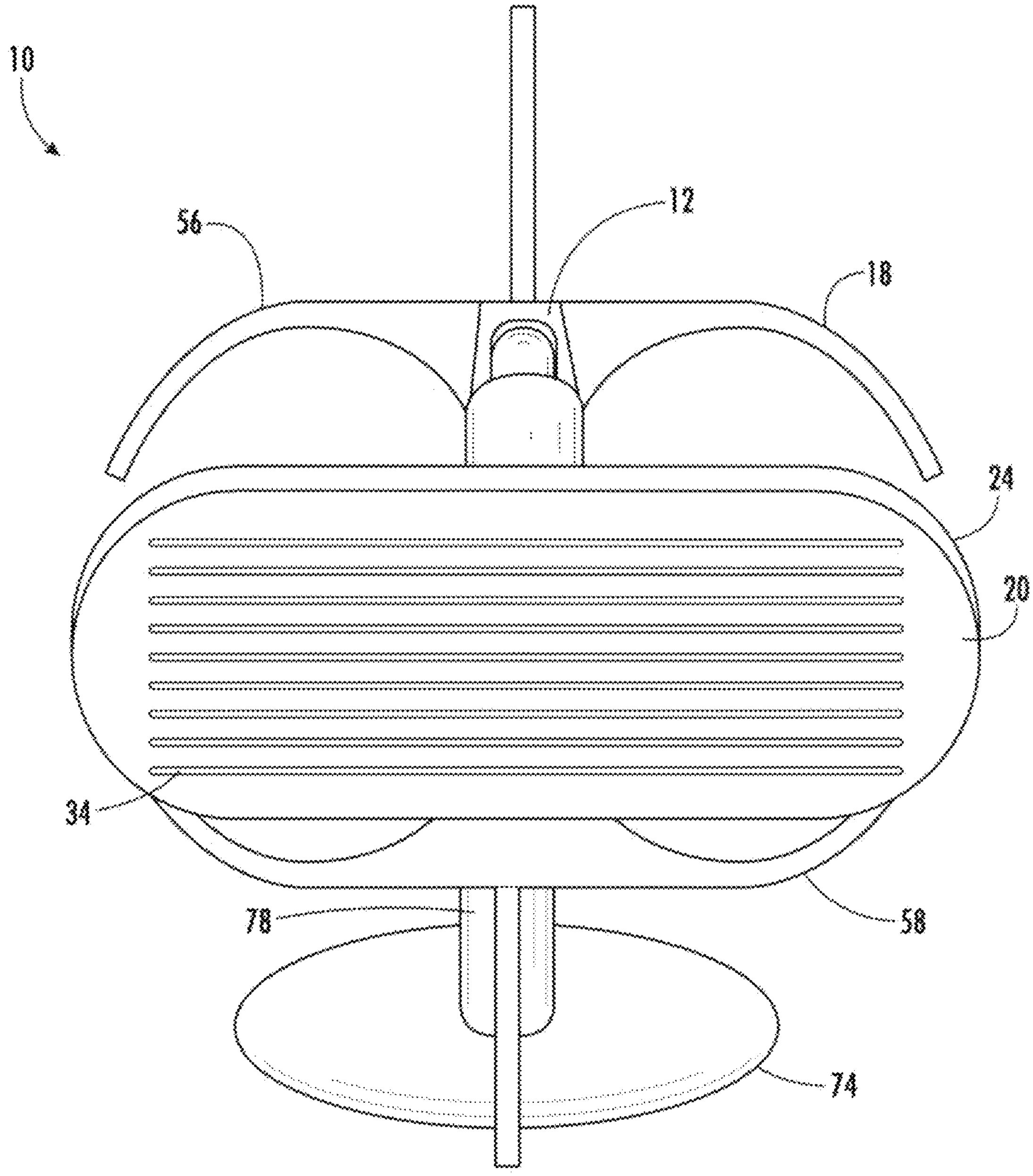
FIG. 4 is a front view of the proprioceptive shaver for shaving intimate areas.
Figure 5:
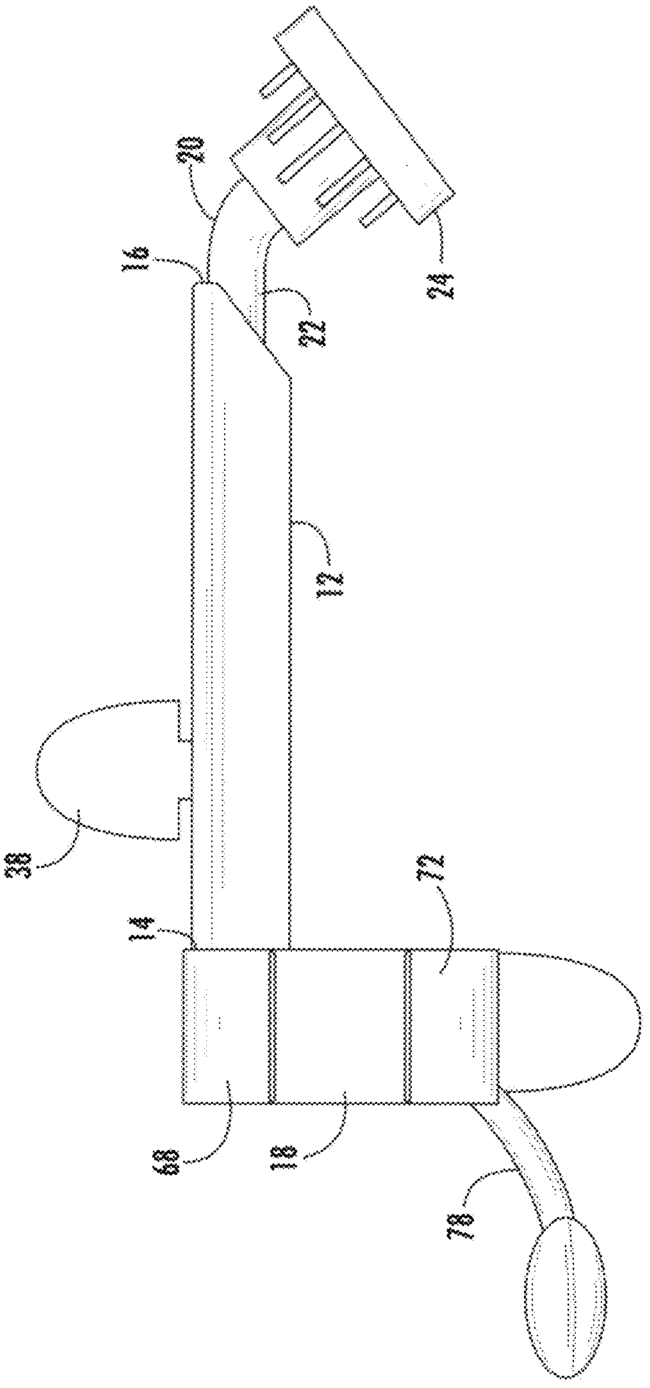
FIG. 5 is a right-side view of the proprioceptive shaver for shaving intimate areas.
Figure 6:
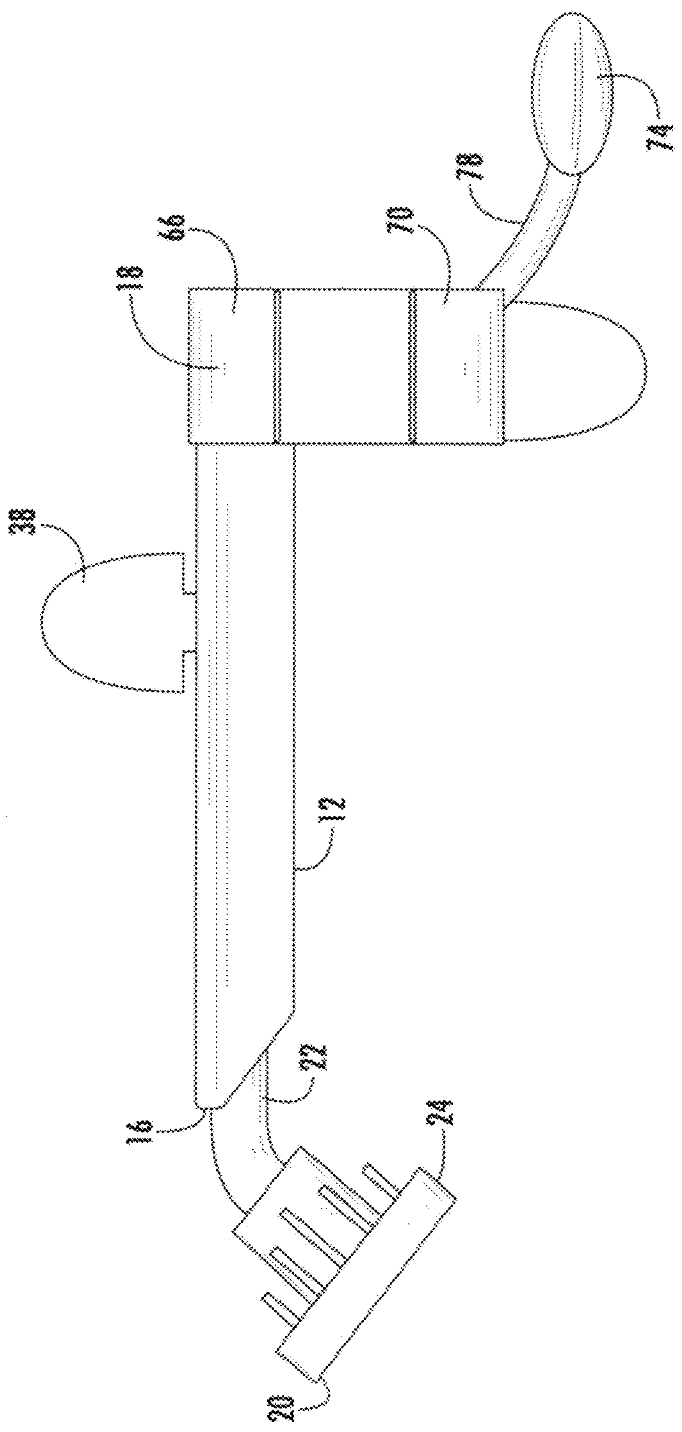
FIG. 6 is a left side view of the proprioceptive shaver for shaving intimate areas.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1-6, an illustrative embodiment of a proprioceptive shaver for shaving/grooming intimate areas, referred to generally as a proprioceptive shaver 10, is shown. The proprioceptive shaver 10 is configured to provide enhanced control of the razor blade as the razor blade is moved over or contacts an area of skin to be shaved or groomed. While the proprioceptive shaver 10 will be described as being useful in shaving grooming intimate areas, such as human genitals and/or surrounding areas, such as a vagina, penis, or testicles, the proprioceptive shaver 10 can be used on other parts of a body as well. Moreover, while the proprioceptive shaver 10 may have particular use in surgical settings or procedures, such use is not intended to be limiting. The proprioceptive shaver 10 comprises a main body 12 separating a first end 14 and a second, opposing end 16. The first end 14 comprises a user engagement portion or member 18 integrally formed from or attached thereto. At the second end 16, a shaving assembly 20 extends therefrom.

Figure 9A:
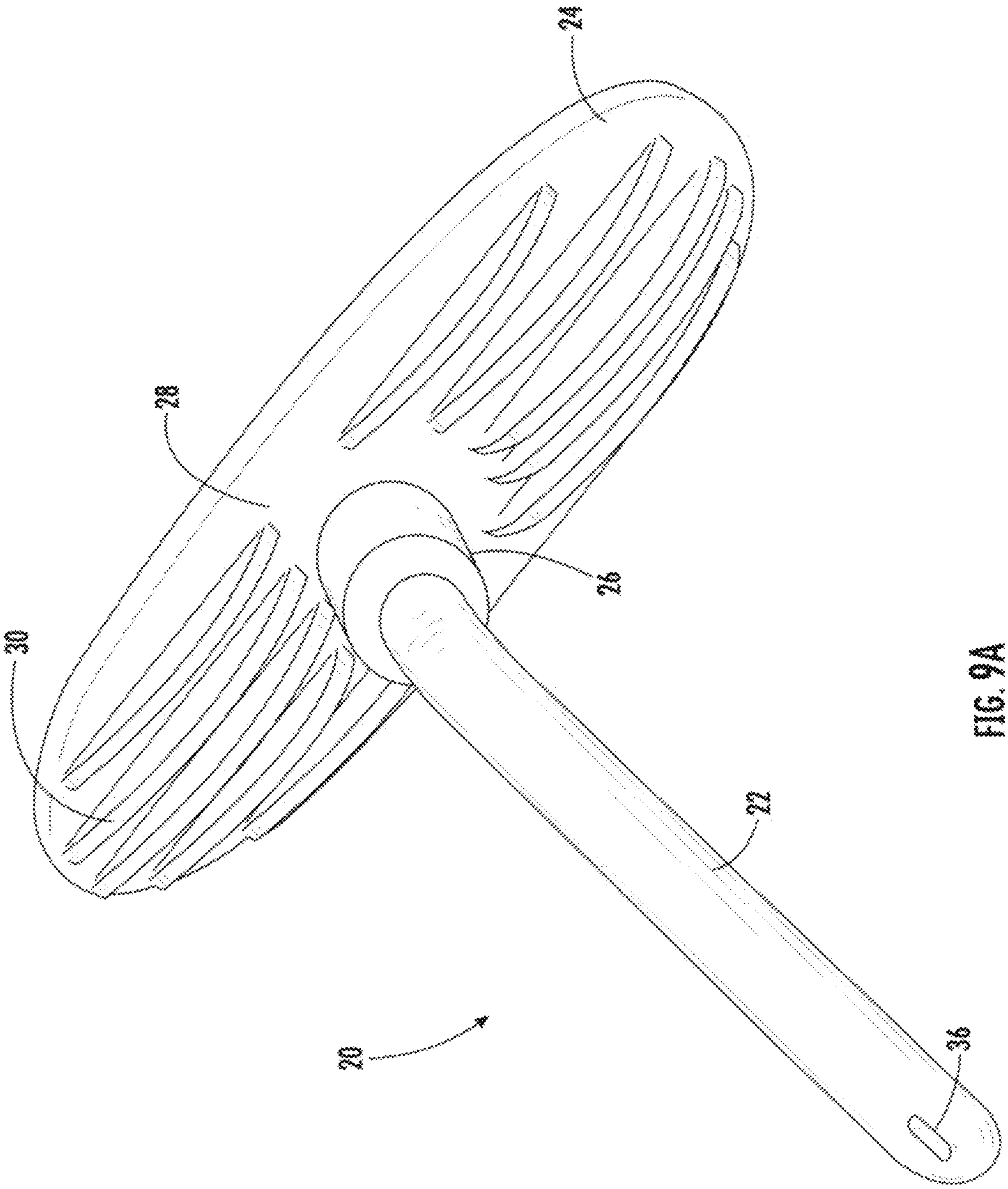
FIG. 9A is a perspective view of the shaving assembly portion/member of the proprioceptive shaver for shaving intimate areas.
Figure 9B:
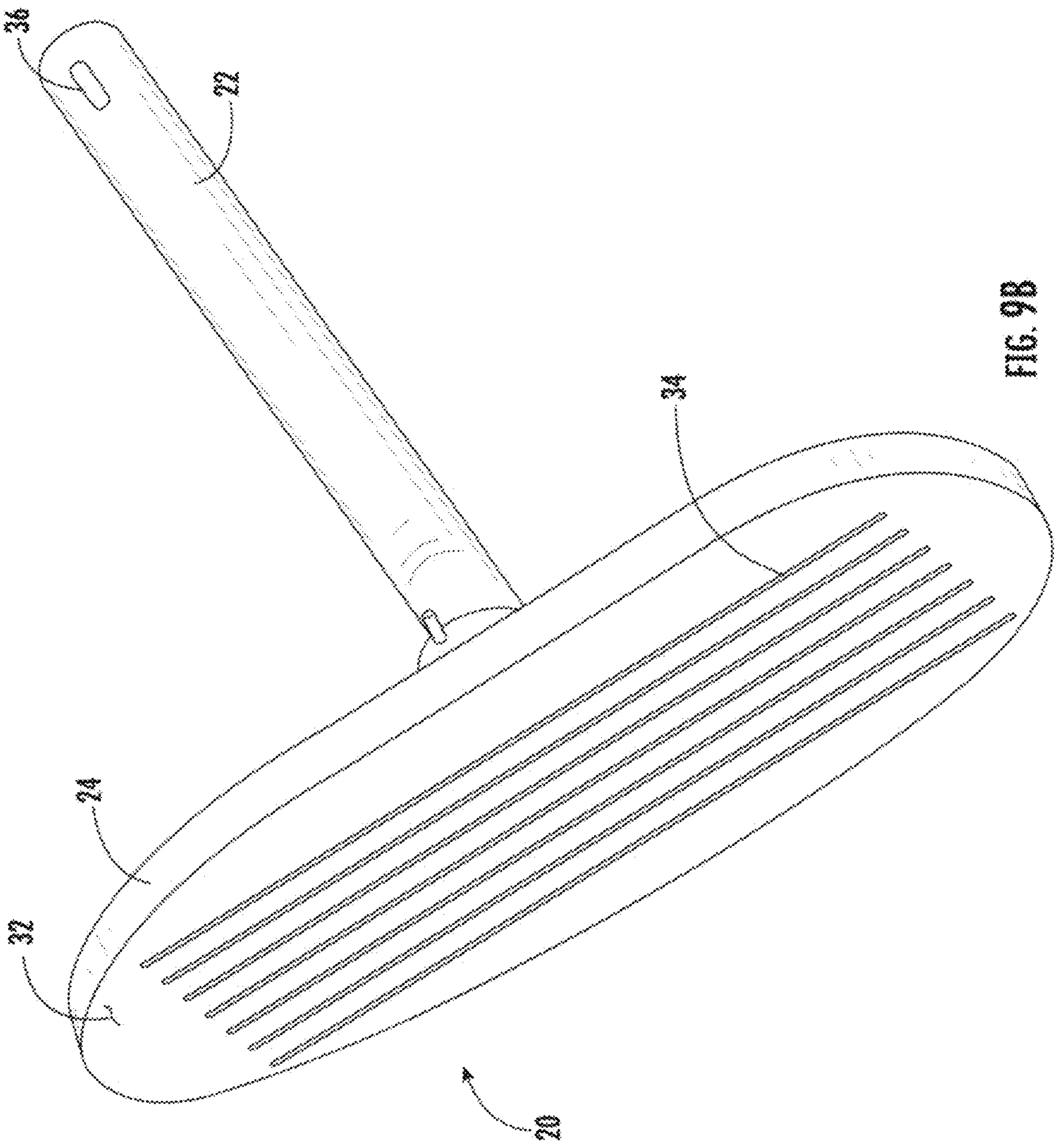
FIG. 9B is an alternative perspective view of the shaving assembly portion/member of the proprioceptive shaver for shaving intimate areas.
Figure 10A:
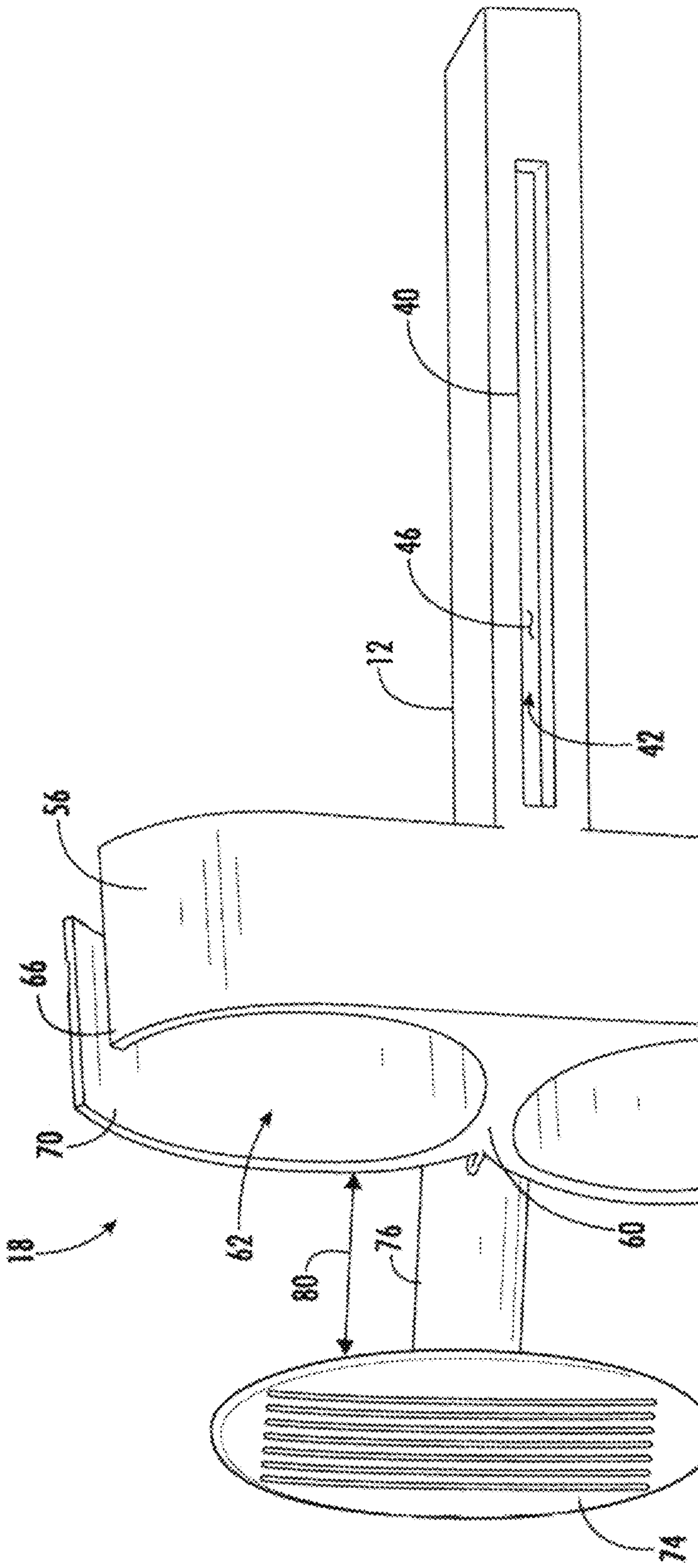
FIG. 10A is a top view of the proprioceptive shaver main body, shown with the shaving assembly removed.
Figure 10B:
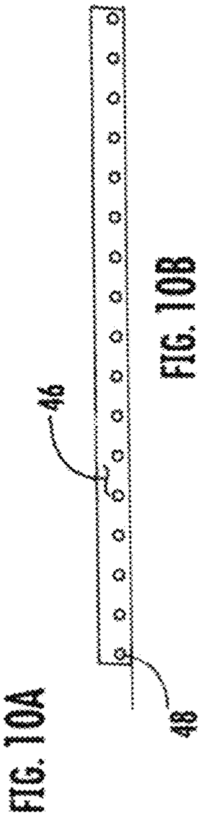
FIG. 10B illustrates one of the internal surfaces of the proprioceptive shaver main body.
Figure 11:
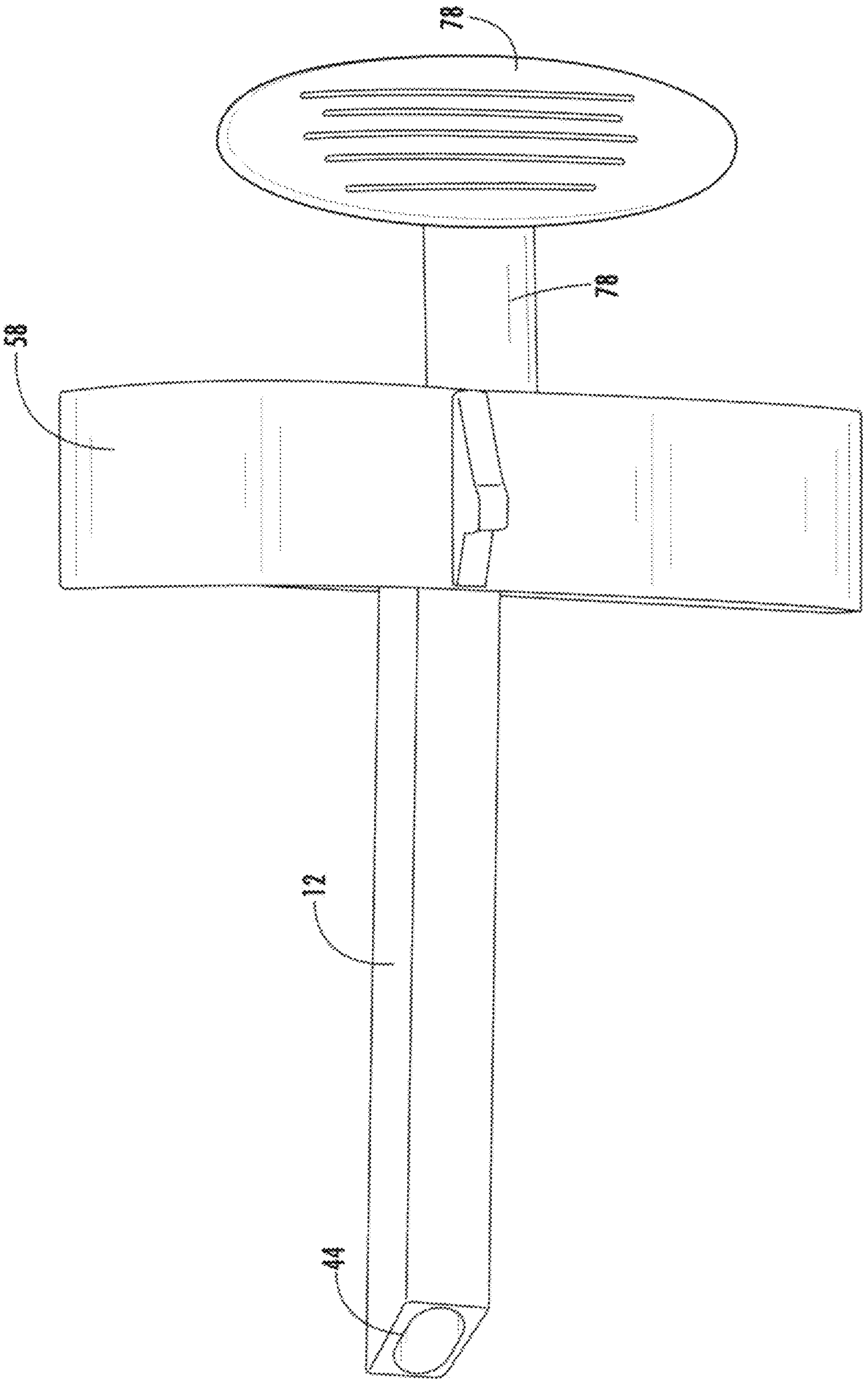
FIG. 11 is a bottom view of the proprioceptive shaver main body, shown with the shaving assembly removed.

Referring to FIGS. 9A and 9B, an embodiment of the shaving assembly 20 is shown. The shaving assembly 20 comprises a body 22, illustrated herein as an elongated shaft or arm, secured to a razor head 24 via a joint 26. The shaving assembly shaft or arm 22 may be straight or contain a curvature. The shaving assembly shaft or arm 22 is sized and shaped to fit and move within the interior portion or region (to be described later) of the proprioceptive shaver main body 12. The razor head 24 may comprise a first surface 28 having one or more griping surfaces 30, shown herein as ridges to allow a user's fingers to grip the razor head 24 when in use, i.e. grooming or shaving. A second, opposing surface 32 may contain one or more cutting surfaces 34, such as razor blades. The shaving assembly shaft or arm 22 may contain an opening 36 sized and shaped to receive and store therein a locking member 38, illustrated herein as a pin (see FIG. 1). Once inserted, the pin 38 locks the shaving assembly shaft or arm 22 in place (at various positions) within the proprioceptive shaver main body 12.

Referring to FIGS. 10A-13, the proprioceptive shaver main body 12 is shown with the shaving assembly 20 removed. The proprioceptive shaver main body 12 may comprise an opening 40, illustrated herein as an open slit or channel, exposing the interior portion or region 42. The interior portion or region 42 is preferably hollow or partially hollow and sized and shaped to allow at least a portion of the shaving assembly shaft or arm 22 to fit within, and to move, preferably slidably in a linear direction therein. A user simply inserts at least a portion of the shaving assembly shaft or arm 22 into the proprioceptive shaver main body second end opening 44. Once in a desired position, the user places the pin 38 into the shaving assembly shaft or arm opening 36. The interior portion bottom surface 46 (see FIGS. 10A and 10B) of the proprioceptive shaver main body 12 may contain a plurality of spaced apart pin receiving members 48, illustrated herein as dimples or small openings.

Figure 7:
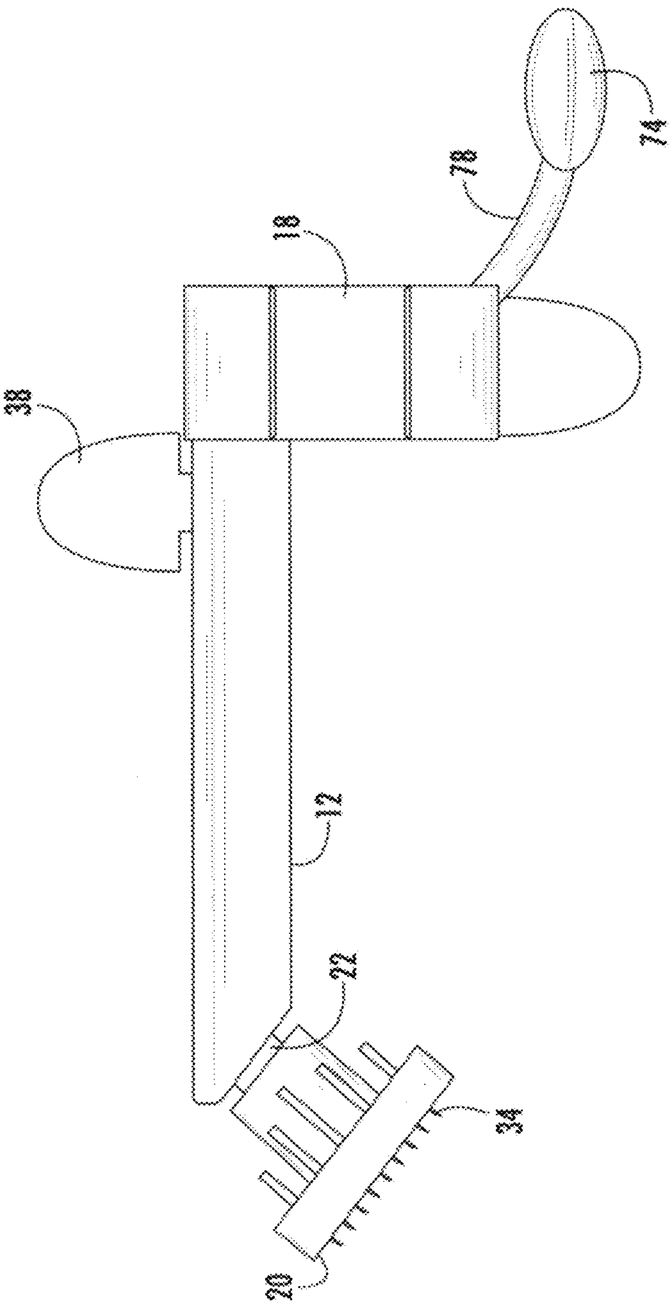
FIG. 7 illustrates the proprioceptive shaver for shaving intimate areas in a first, non-extended position.
Figure 8:
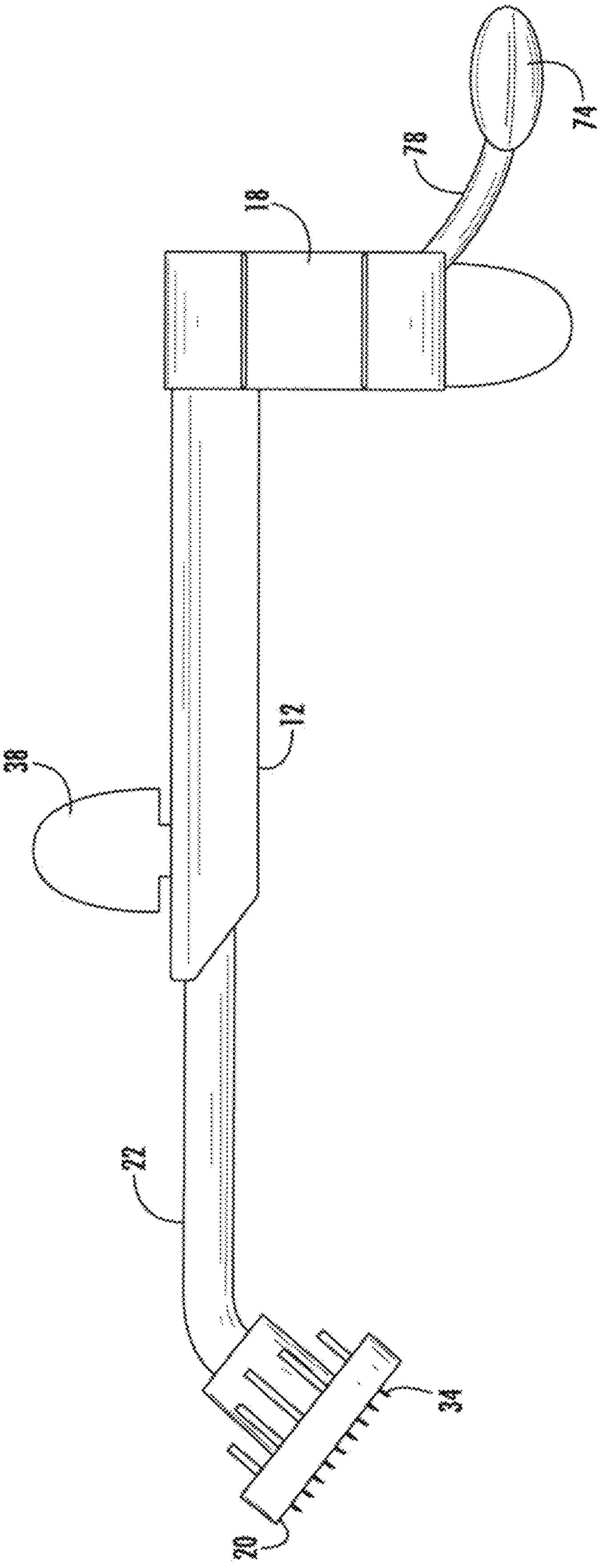
FIG. 8 illustrates the proprioceptive shaver for shaving intimate areas in a second, extended position.

When at least a portion of the pin 38 (preferably a pointed portion) is oriented to and rests within the pin receiving members 48, the shaving assembly shaft or arm 22 is locked in place. To orientate and position the shaving assembly shaft or arm 22 in another location within the proprioceptive shaver main body 12, the user removes the pin 38, slides the shaving assembly shaft or arm 22 to the left or right (further or closer to the first end 14), see FIG. 7, the proprioceptive shaver for shaving intimate areas in a first, non-extended position and FIG. 8, the proprioceptive shaver for shaving intimate areas in a second, extended position. Once in the desired position, the user simply places the pin 38 into and through opening 36. A portion of the pin 38 rests within one of the pin receiving members 48, locking the shaving assembly shaft or arm 22 in place.

The user engagement portion or member 18 is configured to provide the user unique control of the razor head 24 during the grooming or shaving process. Such control is vital for areas such as the human genitals, or surrounding area, that are difficult for an individual to shave themselves safely and effectively. The user engagement portion or member 18 is configured so the proprioceptive shaver 10 provides users with increased awareness of the position and movement of the parts of the body by means of sensory organs (proprioceptors) in the muscles and joints controlling the movement of the razor head 24. Accordingly, the proprioceptive shaver 10 is configured to provide multiple, preferably three, points of contact on two fingers of the same hand. The three points of contact include areas at or near the metacarpophalangeal joint 50, proximal interphalangeal joint 52, and distal inferior phalanges (fingertips) 54 of the user's hand 55, see FIG. 14. More specifically, the three points of contact include:

1. The area directly underneath the metacarpophalangeal joint of two fingers of the same hand;
2. The area just distal to the metacarpophalangeal joint and proximal to the proximal interphalangeal joint which acts as a fulcrum with no finger contact until #3; and
3. The distal inferior phalanges (fingertips) of the same two fingers on the same hand, which is connected to number two by a flexible adjustable shaft (to be described later).

As a result, a unique leverage is created between the metacarpophalangeal joint and the distal two inferior phalanges (fingertips) on the same hand. This unique and exaggerated leverage creates an increased proprioception and awareness of the position and movement of the razor while it is being moved across intimate skin. This increased proprioception of the razor blades allows for a much safer intimate grooming experience in areas that are difficult to shave safely, see FIGS. 14 and 15.

The user engagement portion or member 18 may include a first portion (also referred to as an upper portion, referring to positioning on an anterior (back or dorsal side) surface of a finger) 56, a second portion (also referred to as a lower portion referring to positioning on a posterior (palmer side) surface of a finger) 58, and a bridge 60 connecting the upper portion 56 and the lower portion 58. The upper portion 56 and the lower portion 58 are preferably arranged in a parallel or generally parallel arrangement, separated by a first opening 62 (to the left of bridge 60) and a second opening 64 (to the right of bridge 60). The upper portion distal ends 66 and 68 may have a partial curvature and extend down towards (but do not touch, thus forming an open or partial ring configuration) lower portion distal ends 70 and 72. The lower portion distal ends 70 and 72 may also have a partial curvature and extend upwards) towards (but do not touch, thus forming an open or partial ring configuration) upper portion distal ends 66 and 68. Both areas define the size and shape of openings 62 and 64, which are sized and shaped to fit, receive and support portions of a user's fingers. The upper portion 56 and the lower portion 58, particularly the upper portion distal ends 66 and 68 and the lower portion distal ends 70 and 72 may be made of a flexible material so that they can accommodate different sized fingers. Alternatively, the upper portion distal ends 66 and 68 and the lower portion distal ends 70 and 72 may connect, thus forming a closed ring structure.

Positioned away from the upper portion 56 and the lower portion 58 is a leverage bar 74. The leverage bar 74 is attached to or is integrally formed from a portion of the lower portion 58 as an intermediate member 76, illustrated herein as an elongated body. The intermediate member 76 is shown having a curved surface 78, see FIG. 5, which positions the leverage bar 74 away from the upper portion 56 and the lower portion 58 of the user engagement portion or member 18 via a distance or gap 80, and orientating the leverage bar 74 so it 1) is parallel or generally parallel to the upper portion 56 and the lower portion 58, and 2) when in use, rests in the area directly underneath the metacarpophalangeal joint of two fingers of the same hand. Accordingly, the size (and shape) of the leverage bar 74 must be sufficient to rest and/or span in the area directly underneath the metacarpophalangeal joint of two fingers of the same hand. The distance or gap 80 must be sufficient, so when in use (placed on two fingers), the upper portion 56 and the lower portion 58 aligns with or rests at the area just distal to the metacarpophalangeal joint and proximal to the proximal interphalangeal joint, acting as a fulcrum with no finger contact until distal inferior phalanges (fingertips) of the same two fingers on the same hand contact the razor head 24.

Figure 12:
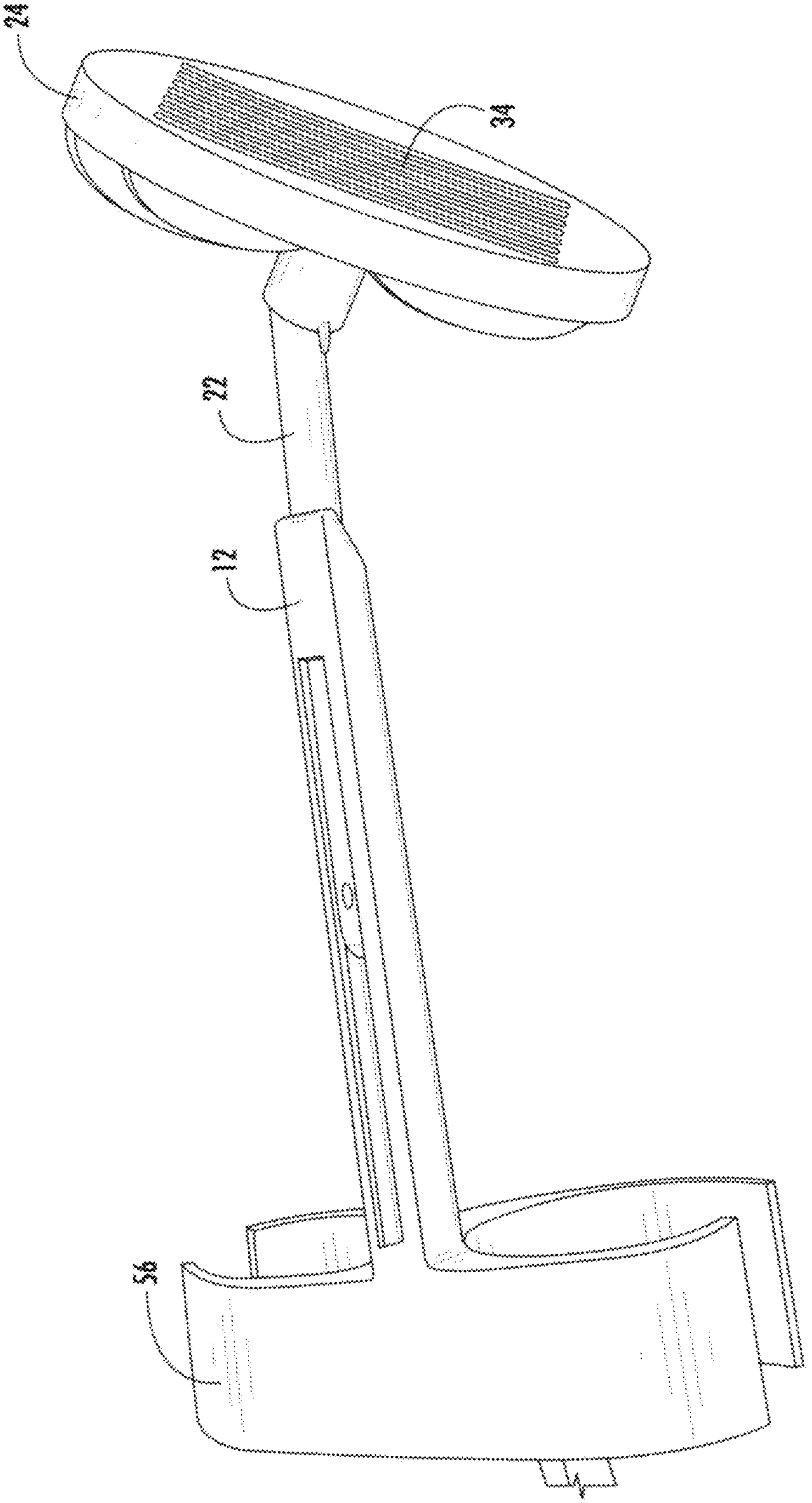
FIG. 12 illustrates the razor portion of the shaving assembly portion/member shown rotated from a first shaving position.
Figure 13:
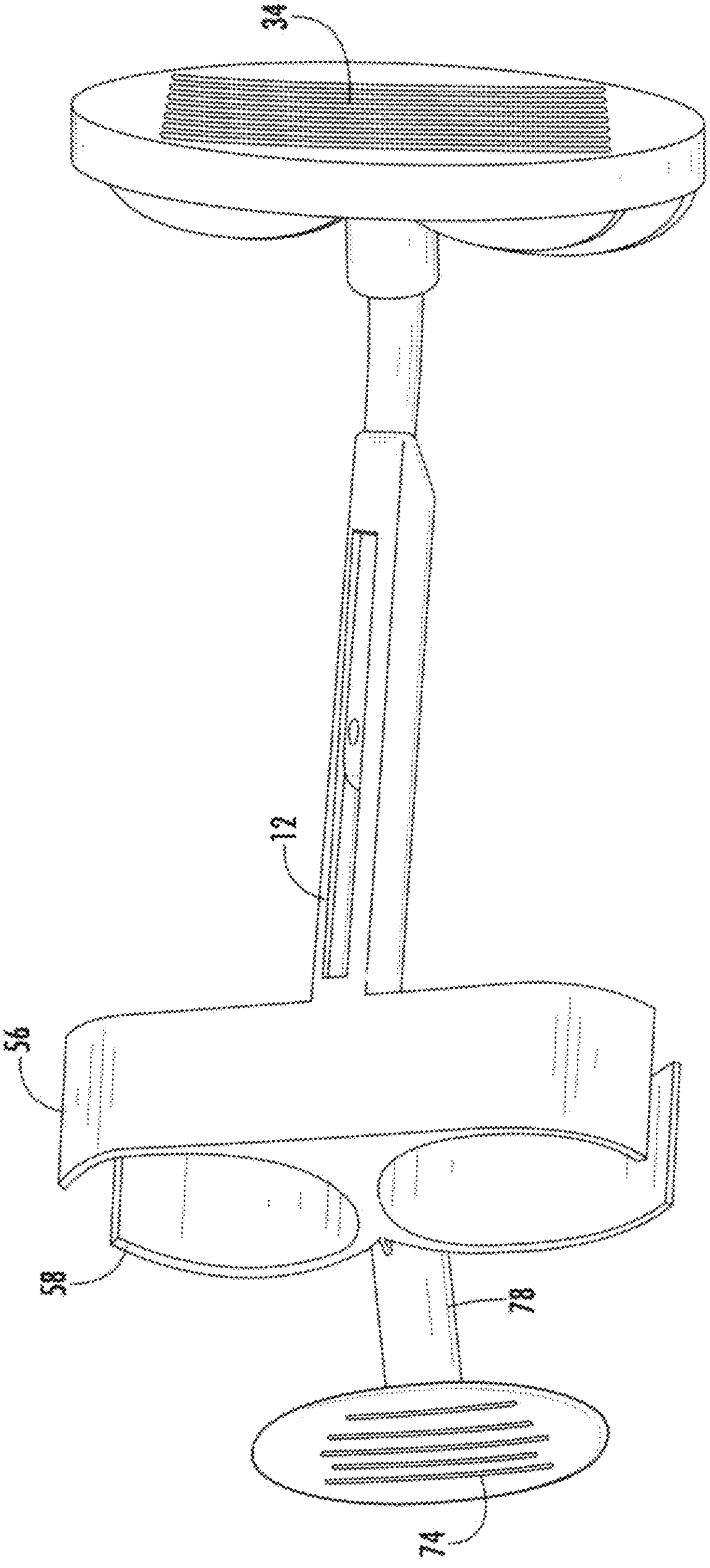
FIG. 13 illustrates the razor portion of the shaving assembly portion/member shown rotated from a first shaving position.

The proprioceptive shaver 10 may also comprise a razor head 24 which is configured to rotate (greater than 0 degrees to 360 degrees). FIG. 12 illustrates the razor head 24 rotated 90 degrees from a first position (as shown in FIG. 1). FIG. 13 illustrates the razor head 24 rotated 180 degrees from the first position. Such rotation allows a user to shave with the grain or against the grain, allowing the user to push or pull while shaving. The razor head 24 may rotate simply by rotating the shaving shaft or arm 22 and locking in place as described above. Alternatively, the razor head 24 may be designed to pivot and rotate about the shaving shaft or arm 22.

Referring to FIGS. 16-20B, an alternative embodiment of a proprioceptive shaver for shaving/grooming intimate areas, referred to generally as a proprioceptive shaver 100, is shown. The proprioceptive shaver 100 has the same functionality as that defined and described for proprioceptive shaver 10. That is, proprioceptive shaver 100 is configured to provide enhanced control of the razor blade as the razor blade is moved over or contacts an area of skin to be shaved or groomed. The proprioceptive shaver 100 is further constructed and arranged to allow a user to make two types of adjustments to various components, a vertical adjustment and a horizontal adjustment.

The proprioceptive shaver 100 comprises a body 112 having a first end 114 and a second, opposing end 116. The first end 114 comprises a user engagement portion or member 118 integrally formed from or attached thereto. At the second end 116, a shaving assembly 120 extends therefrom. The proprioceptive shaver 100 is designed to allow for user adjustment along two axes, adjusting the user engagement portion or member 118 along a vertical axis or the shaving assembly 120 along a horizontal axis.

Referring to FIGS. 21-24, the shaving assembly 120 is illustrated. The shaving assembly 120 comprises a body 122, illustrated herein as an elongated shaft or arm, secured to, or integrally formed as a single unit, a finger support platform 124. The finger support platform 124 comprises an upper member or wall 126 having a first section 128 sized and shaped to receive and support a first finger and a second section 130 sized and shaped to receive and support a second finger. A bottom member or wall 132 (see FIG. 23) is separated from the upper member or wall 126 via a space, thus forming an interior portion 136. The finger support platform 124 may optionally comprise a cover or cap 138, which mirrors the shape of the finger support platform 124. The cover 138 may be secured to, or is integrally formed from, the finger support platform 124. The cover 138 comprises an upper surface 140 (FIG. 21), providing an area for the user's fingers to rest thereon.

The shaving assembly body 122 comprises an outer surface 142 having a slot 144 cut therethrough, forming a channel 146. The channel 146 is defined by a first channel wall or surface 148, a second, opposing channel wall or surface 150, and a bottom channel wall or surface 151 (see FIG. 22).

Figure 20A:
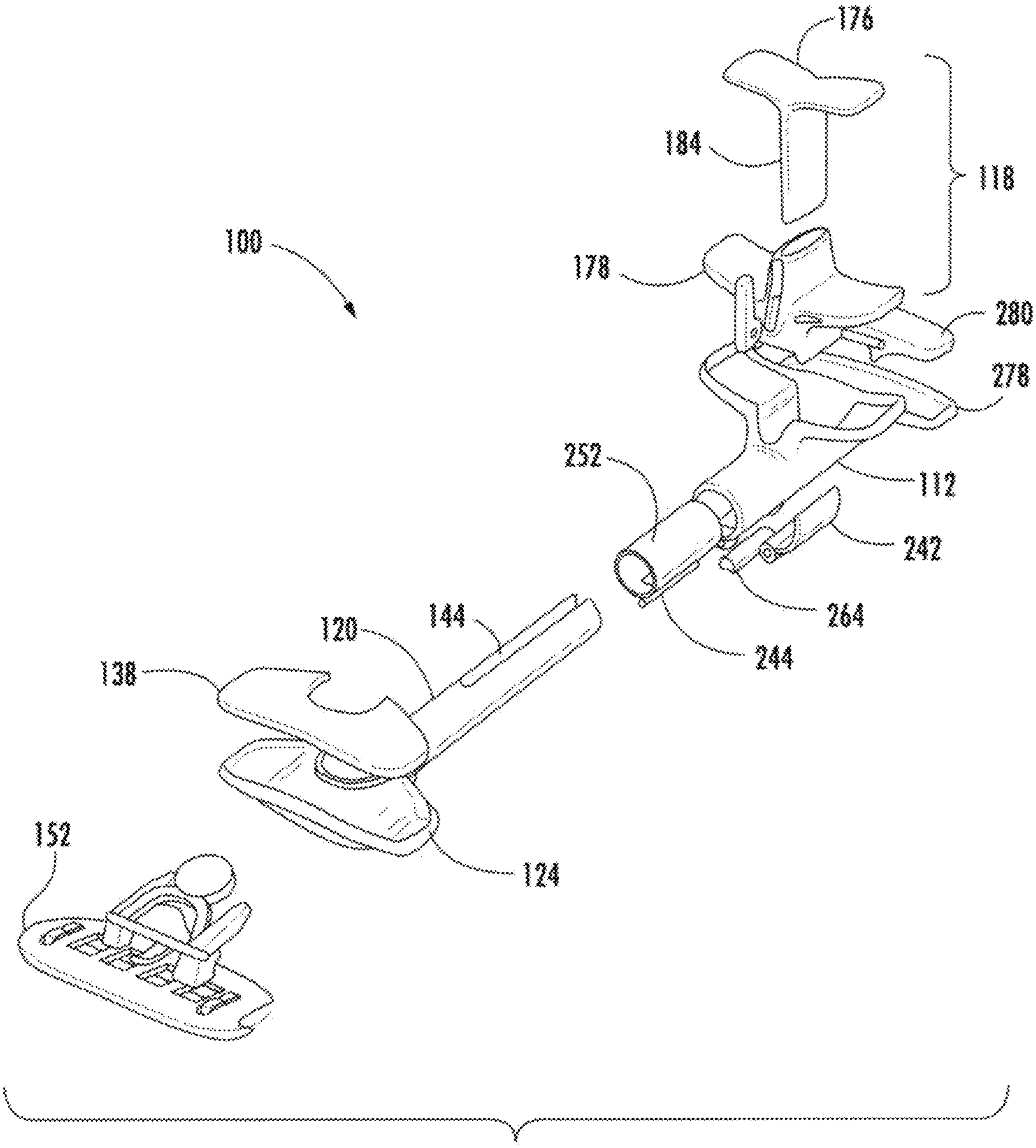
FIG. 20A is an exploded view of the proprioceptive shaver illustrated in FIG. 16.
Figure 20B:
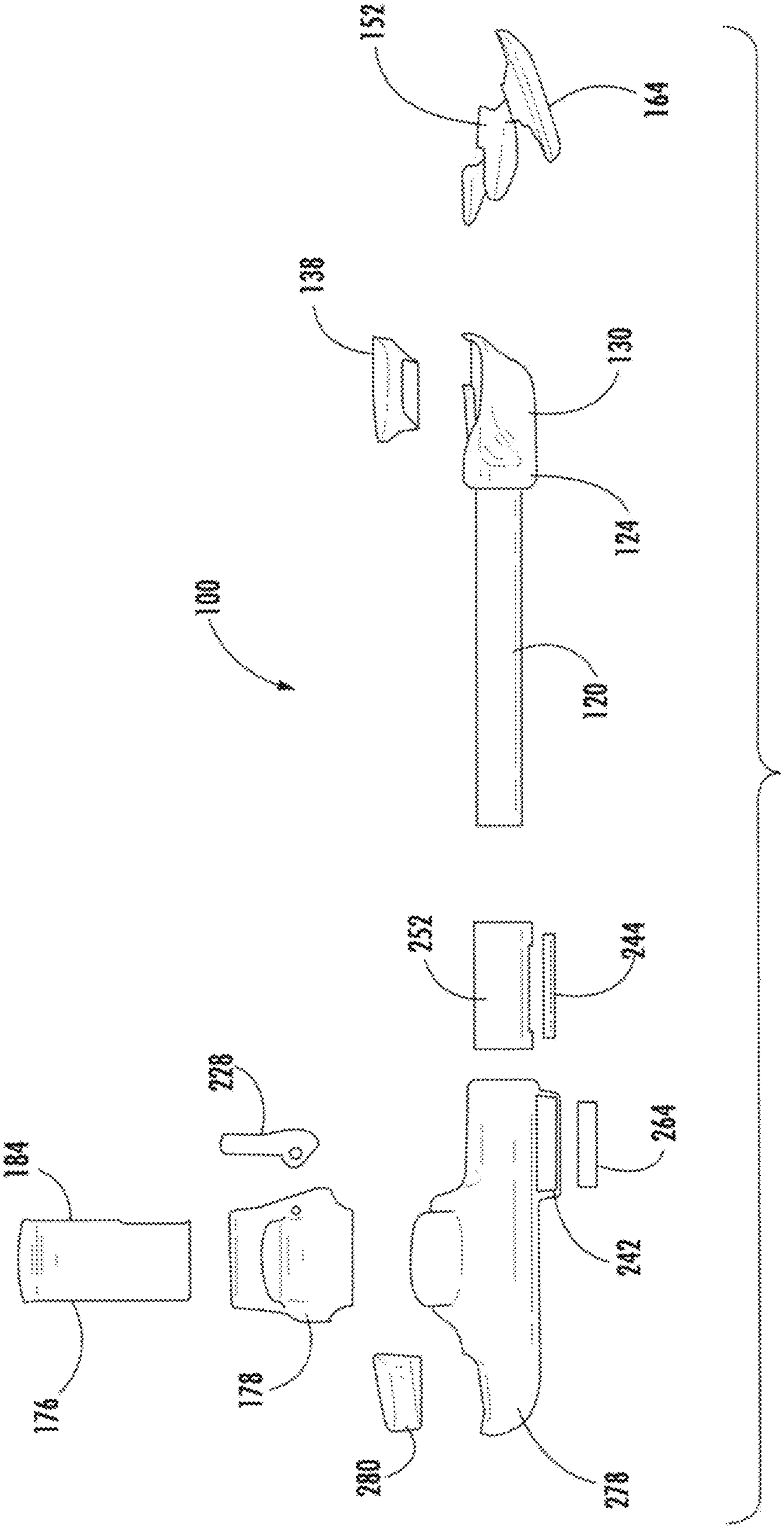
FIG. 20B is an exploded side view of the proprioceptive shaver illustrated in FIG. 16.
Figure 21:
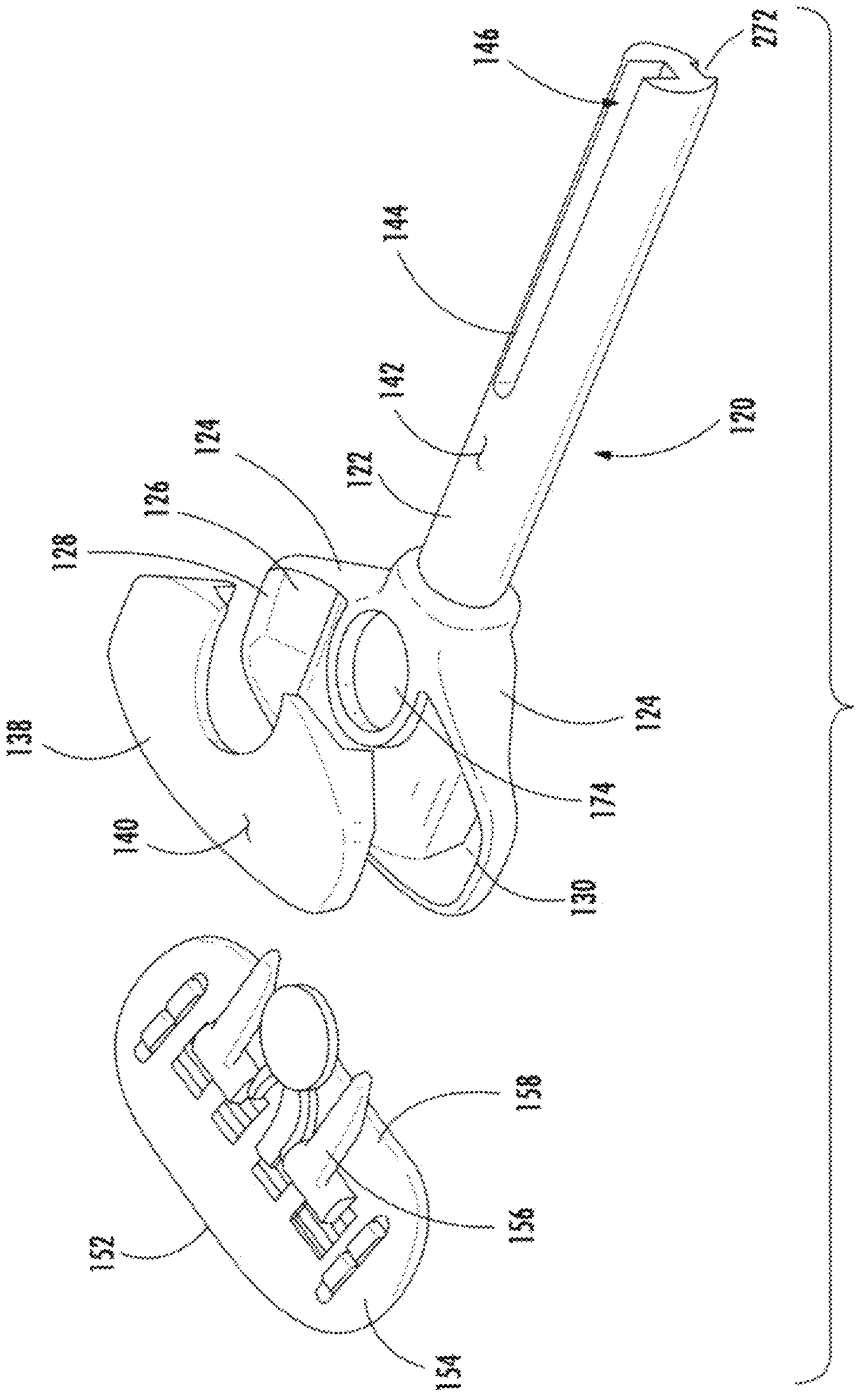
FIG. 21 is an alternative perspective view of the shaving assembly of the proprioceptive shaver illustrated in FIG. 16.
Figure 22:
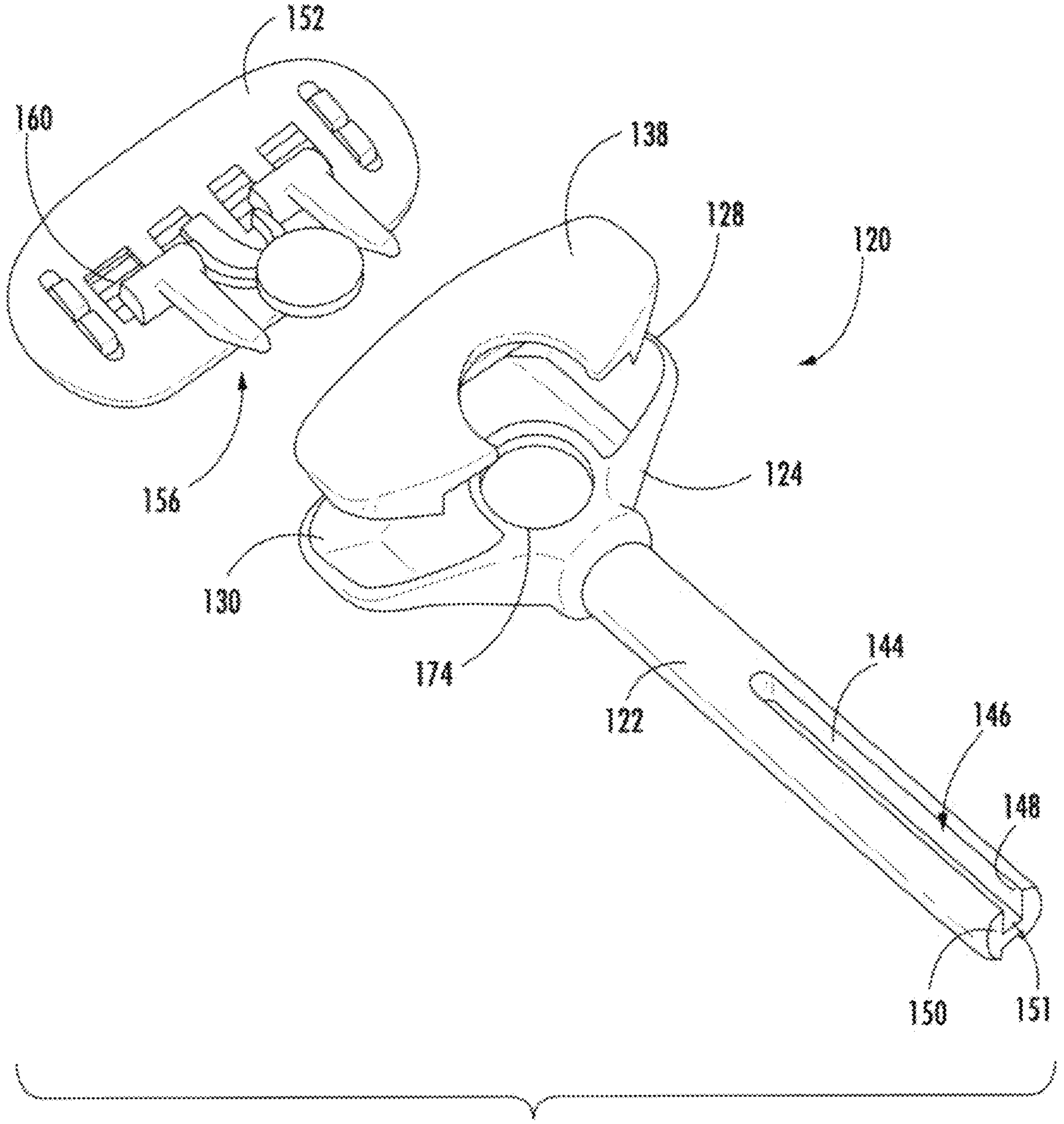
FIG. 22 is an alternative perspective view of the shaving assembly of the proprioceptive shaver illustrated in FIG. 16.
Figure 23:
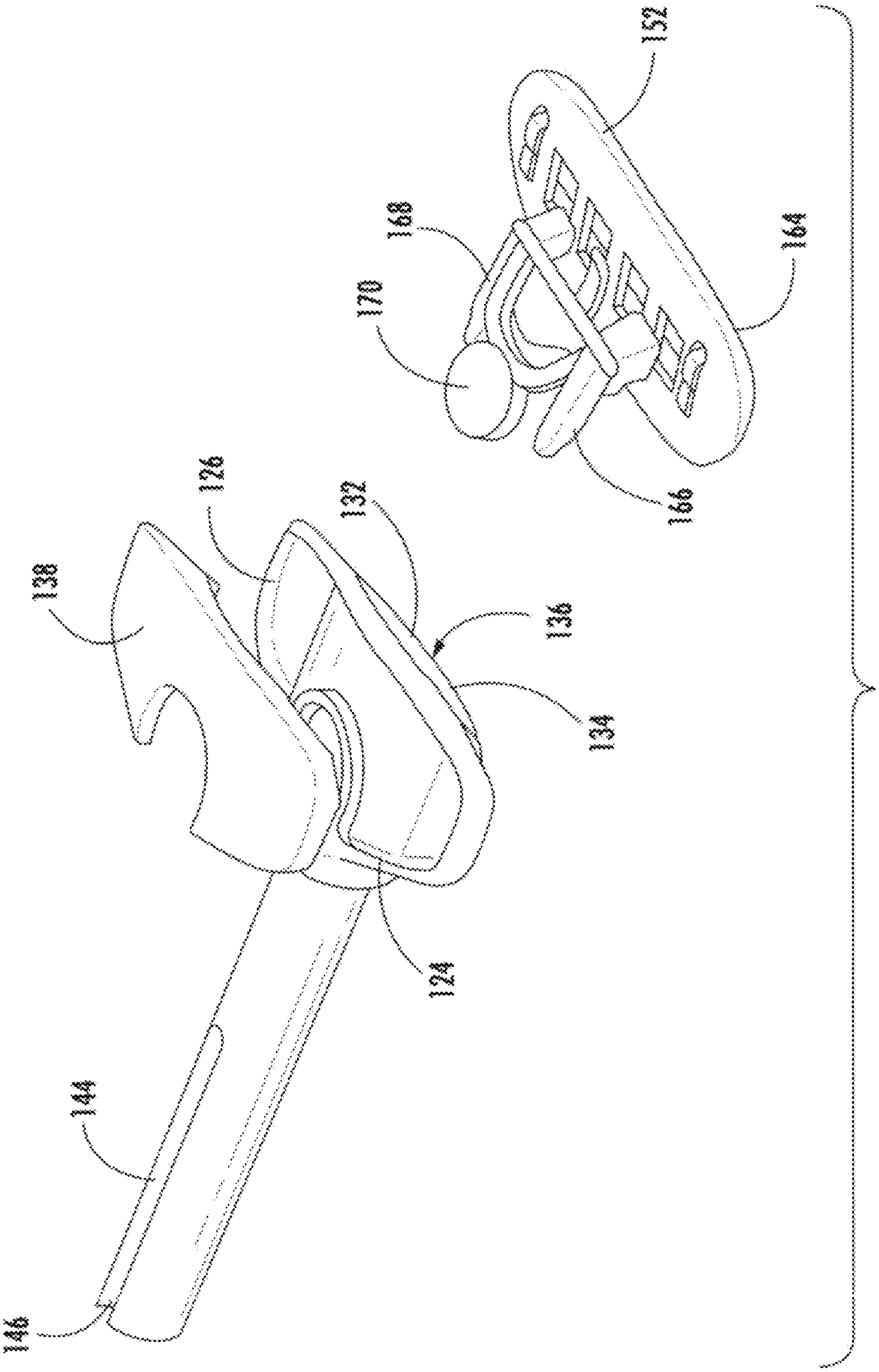
FIG. 23 is an alternative perspective view of the shaving assembly of the proprioceptive shaver illustrated in FIG. 16.
Figure 24:
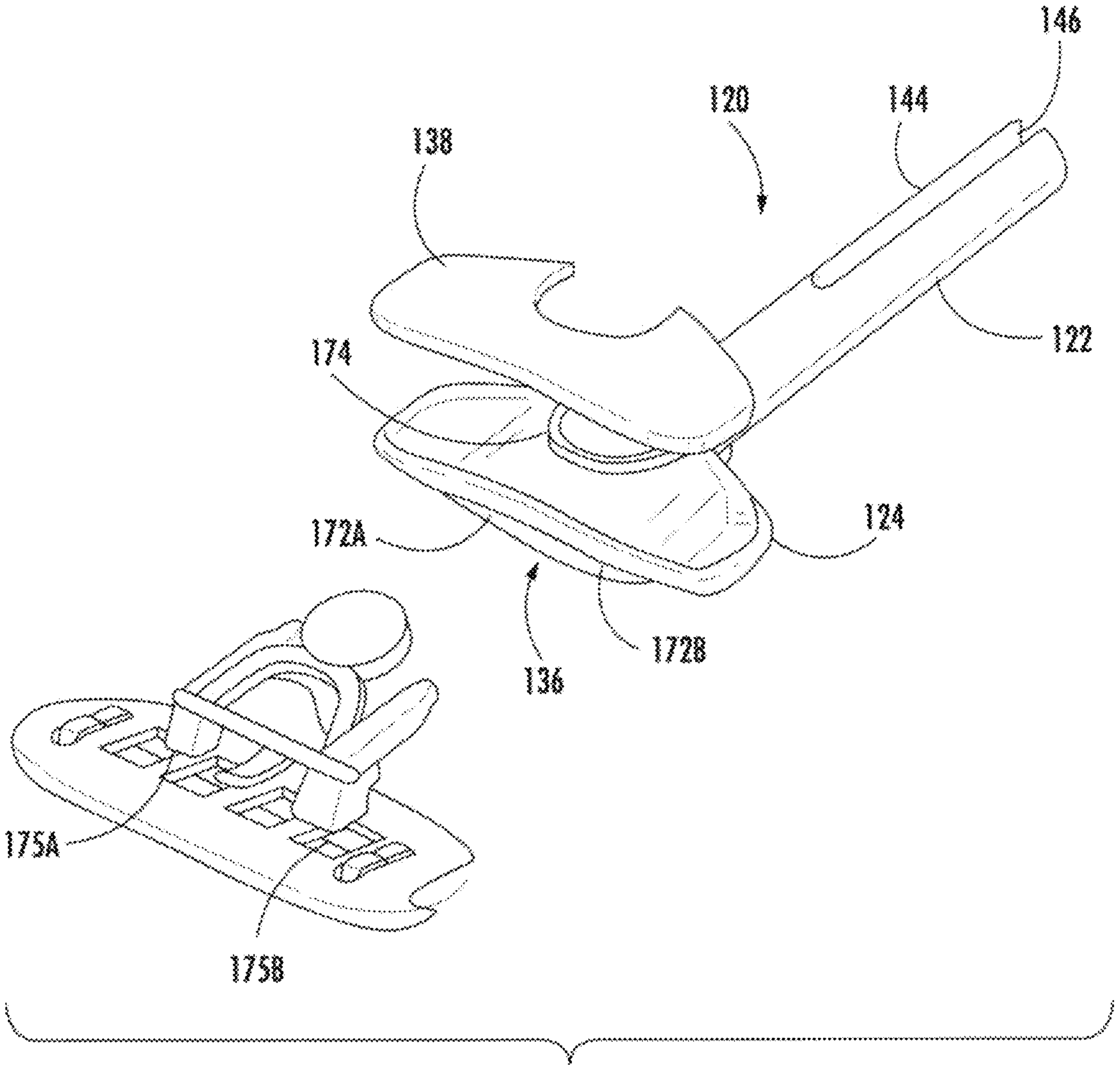
FIG. 24 is an alternative perspective view of the shaving assembly of the proprioceptive shaver illustrated in FIG. 16.

Attached to the shaving assembly 120 is a blade cartridge 152. The blade cartridge 152 comprises a housing 154 having a shaving assembly attachment member 156 on an inner side 158 and one or more cutting blades 160 on an outer side 164 (see FIG. 19; FIG. 20 and FIG. 22, blades shown from back side). The cutting blade 160 may be steel razor blades, and may include one blade, two blades, three blades, four blades, or five or more blades. The shaving assembly attachment member 156 is constructed and arranged to engage with and secure to the finger support platform 124. In an illustrative example, the shaving assembly attachment member 156 comprises a first prong 166, a second prong 168, and a release mechanism 170, illustrated herein as a release button, in between (FIG. 23). The first prong 166 and the second prong 168 are inserted into prong receiving channels 172A and 1728 within the interior 136 of the finger support platform 124, see FIG. 24, Accordingly, the blade cartridge 152 may be removable and disposable.

The blade cartridge 152 may be positioned at an angle relative to the main body 112 or the shaving assembly 120.

The release mechanism 170 is inserted therein as well, resting and locking within a release button receiving member 174, (FIG. 21 and FIG. 24) illustrated herein as a cutout circular shaped section within the finger support platform 124. Once inserted therein, the release mechanism 170 locks in place. Applying a pressure to the release mechanism 170 releases the blade cartridge 152 from the shaving assembly 120. The blade cartridge 152 may be pivotally attached, via pivot members 175A and 175B, thus allowing the blade cartridge 152 and the cutting blades 160 to move as they moves or pivot across the cutting surface, i.e. a user's skin.

Figure 14:
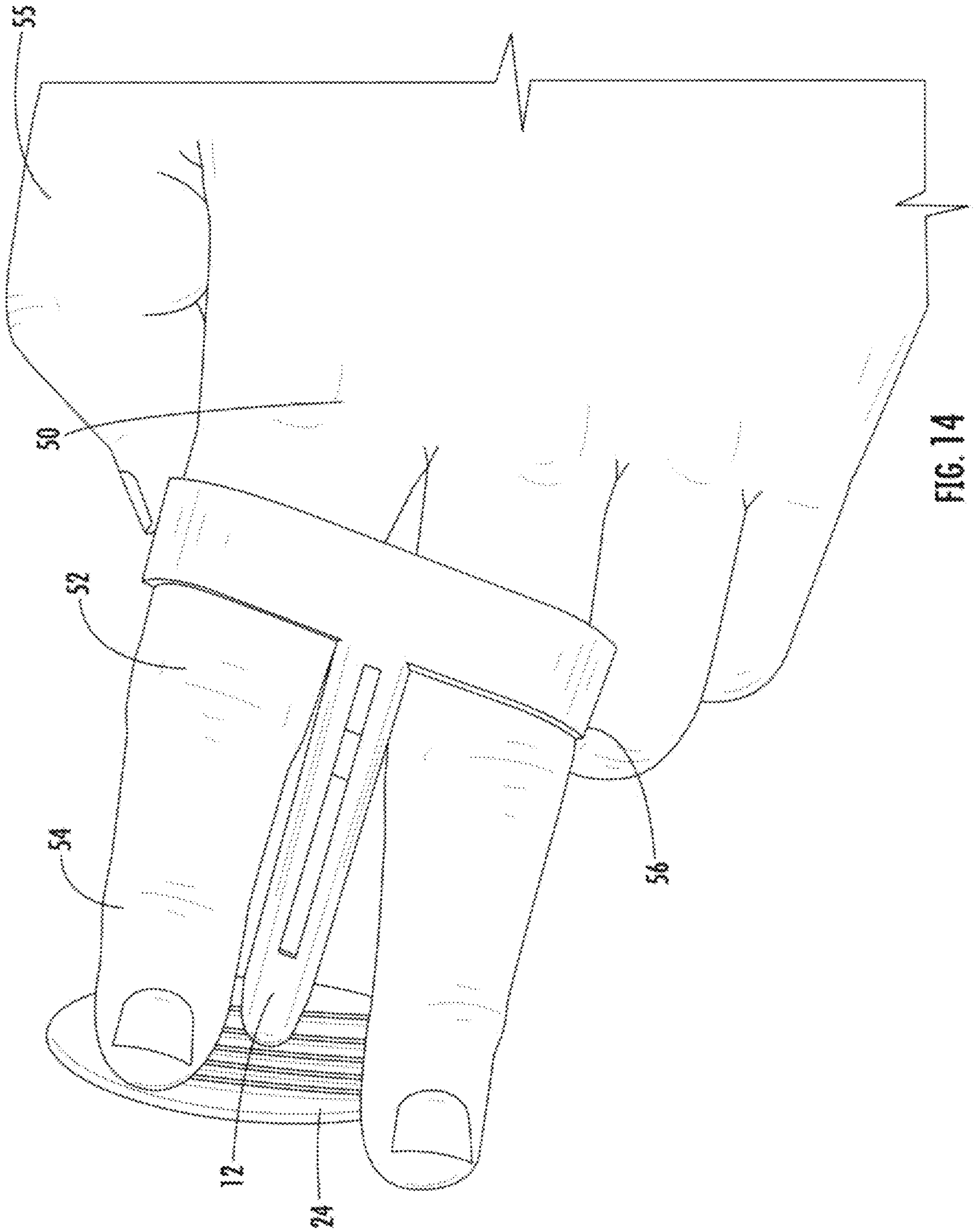
FIG. 14 illustrates the proprioceptive shaver for shaving intimate areas secured in a user's hand.
Figure 15:
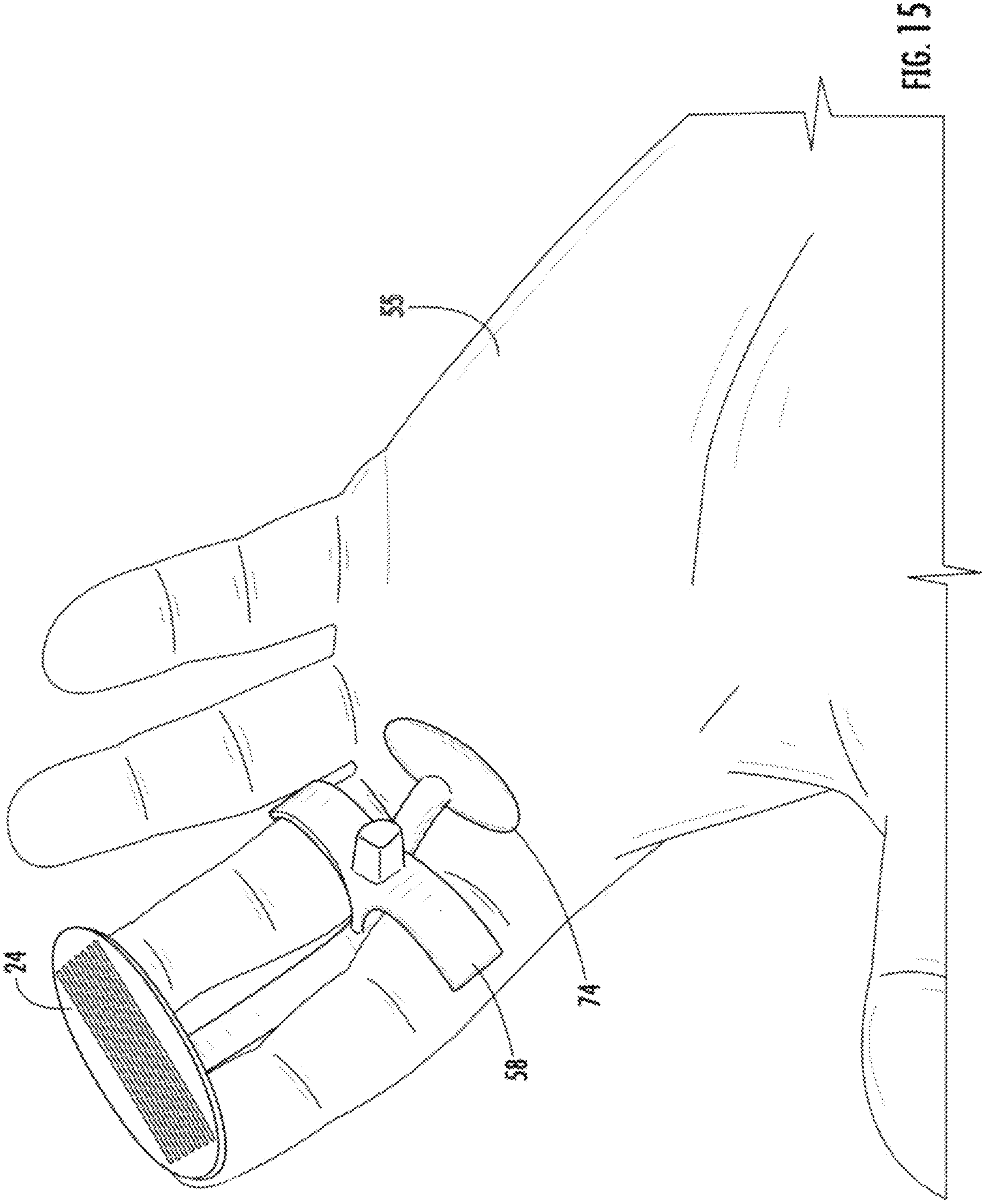
FIG. 15 illustrates an alternative view of the proprioceptive shaver for shaving intimate areas secured in a user's hand.
Figure 16:
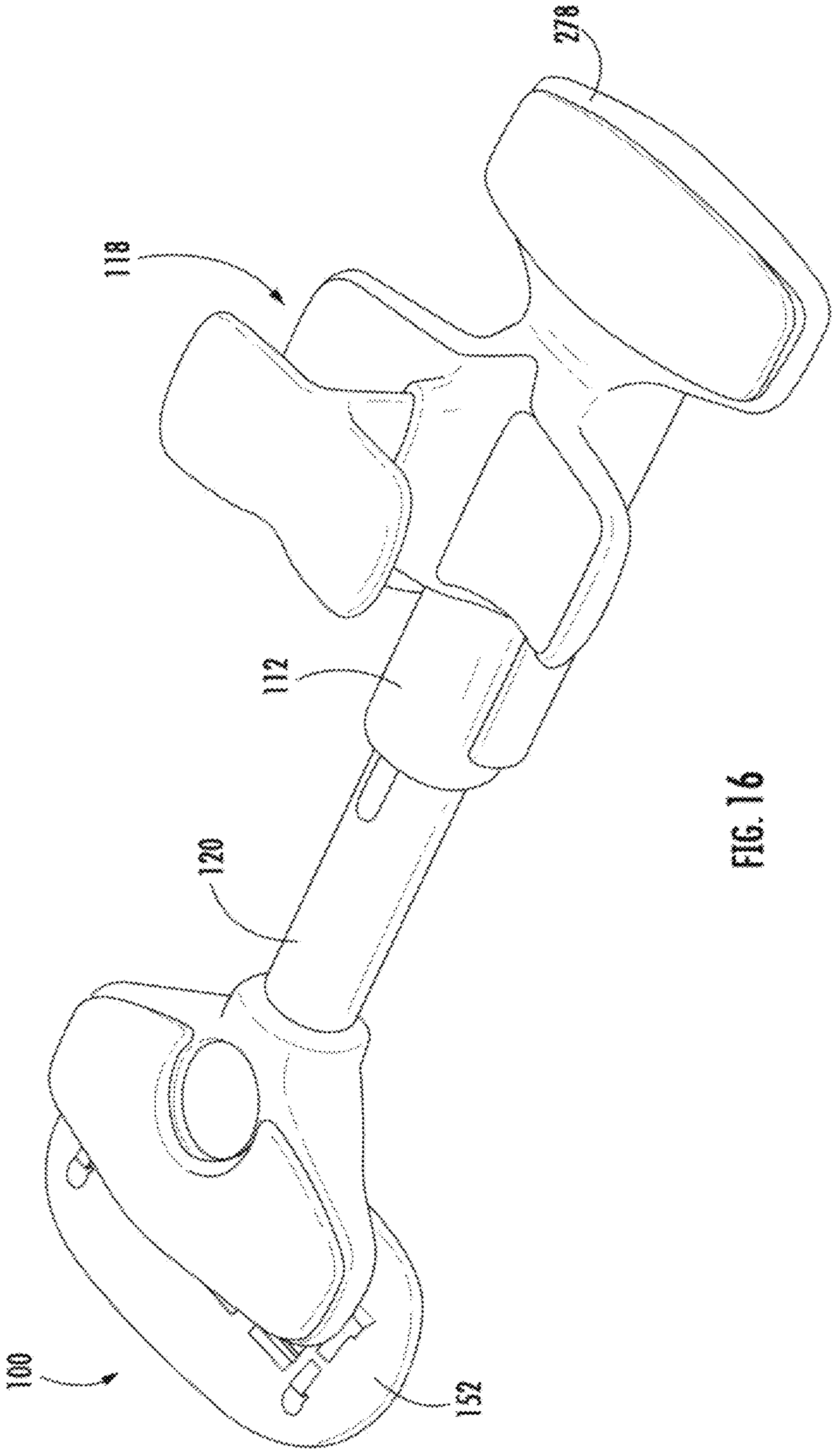
FIG. 16 is a perspective view of the proprioceptive shaver for shaving intimate areas having vertical and horizontal adjustments.
Figure 17:
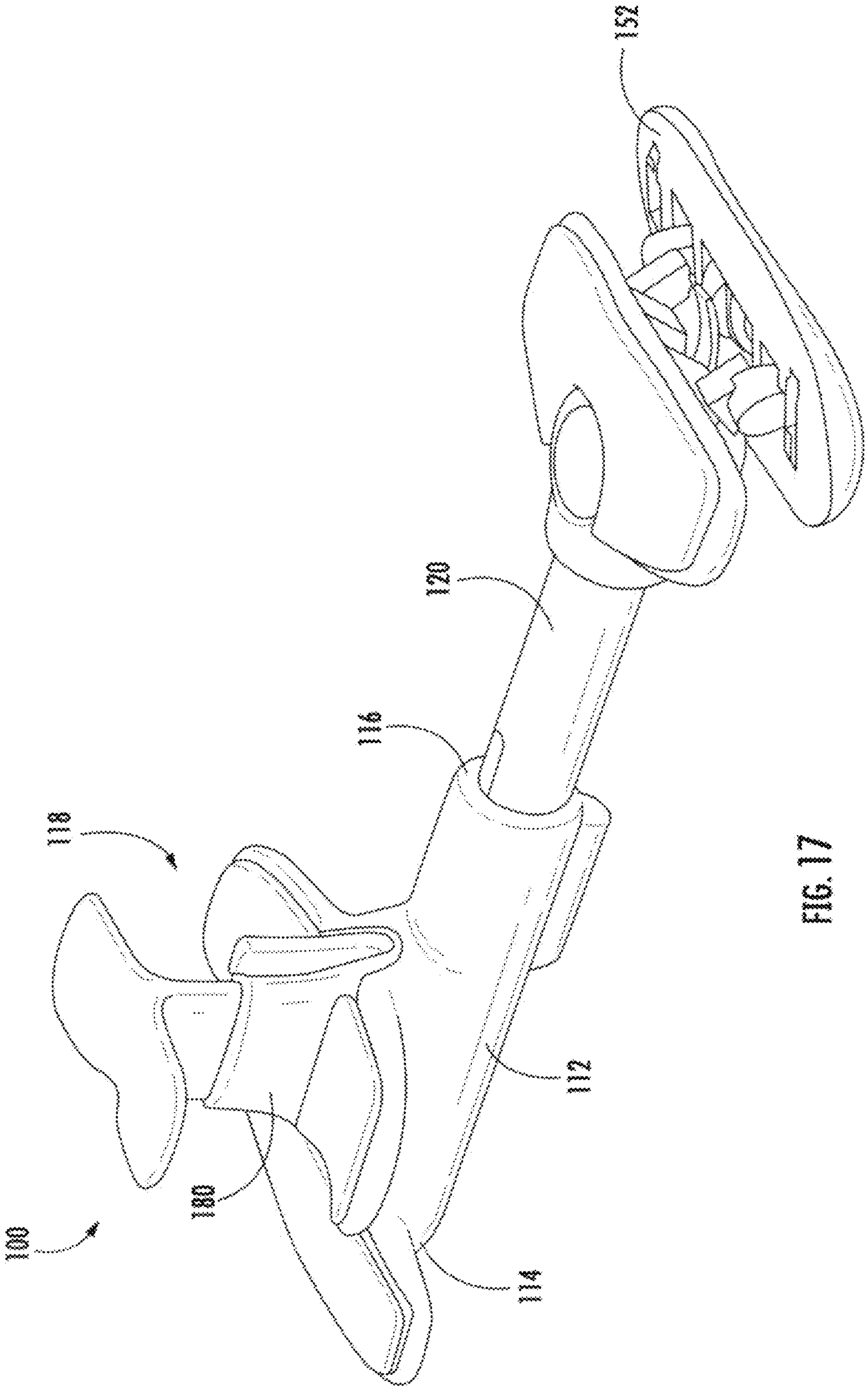
FIG. 17 is an alternative perspective view of the proprioceptive shaver illustrated in FIG. 16.
Figure 18:
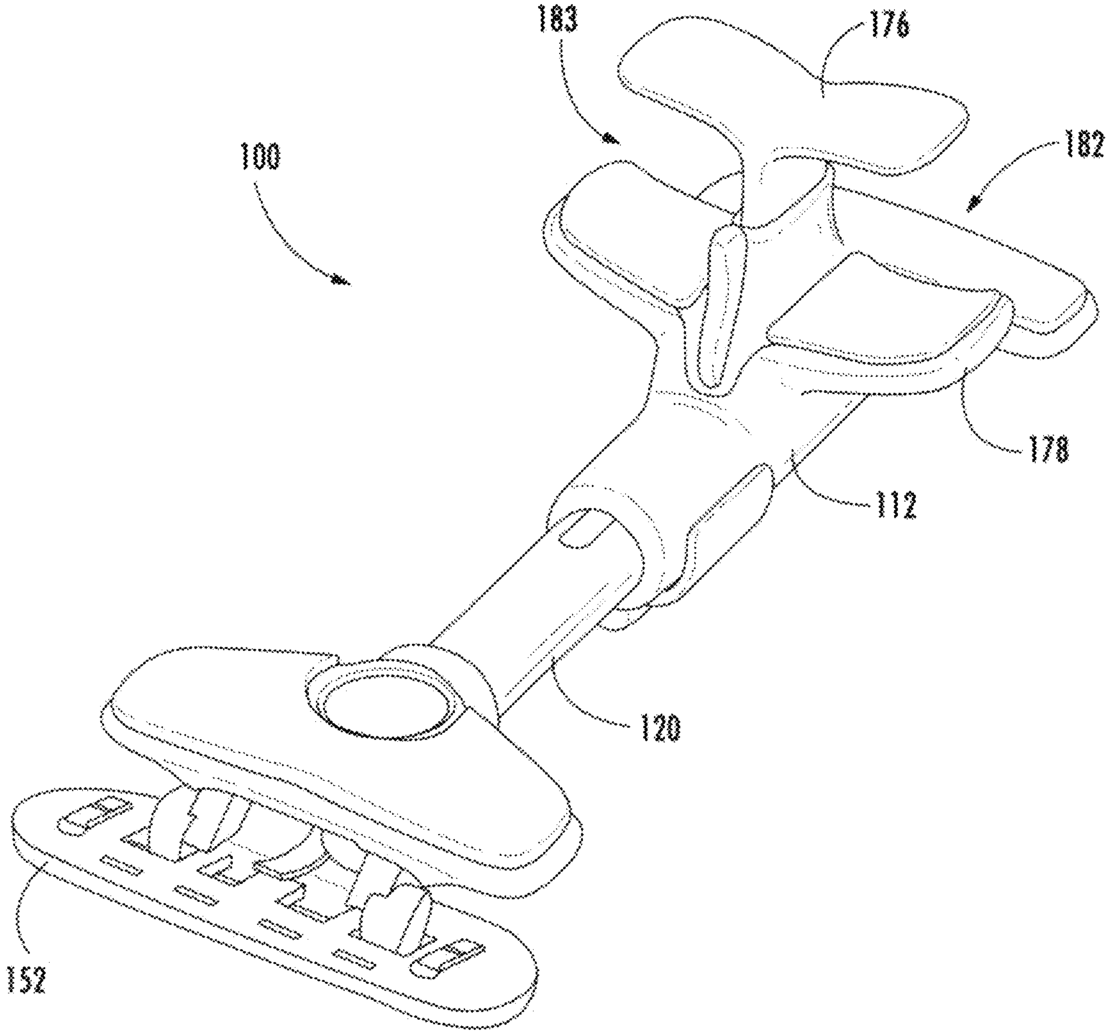
FIG. 18 is an alternative perspective view of the proprioceptive shaver illustrated in FIG. 16.
Figure 19:
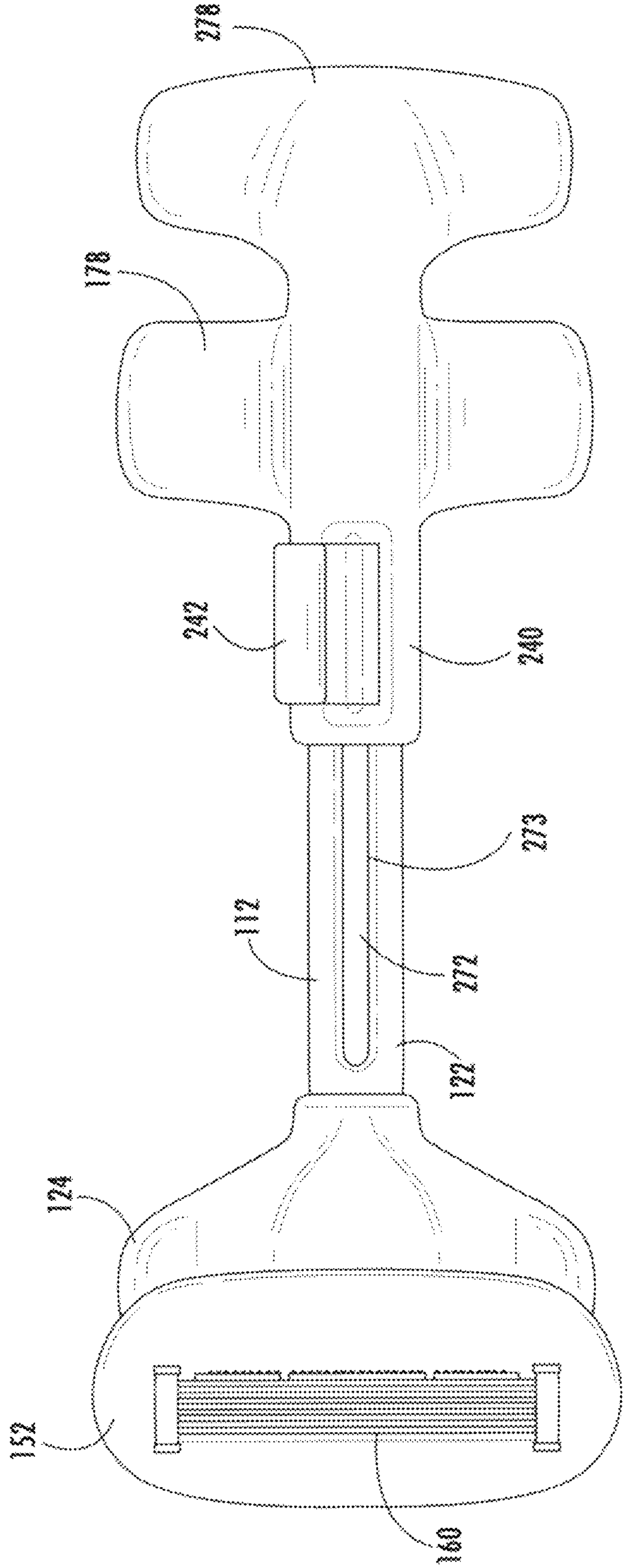
FIG. 19 is a bottom perspective view of the proprioceptive shaver illustrated in FIG. 16.

Referring to FIGS. 25-28, the user engagement portion or member 118 is illustrated in detail. The user engagement portion or member 118 is configured to provide the user unique control of the blade cartridge 152 during the grooming or shaving process. Such control is vital for areas such as the human genitals, or surrounding area, that are difficult for an individual to safely and effectively shave themselves. The user engagement portion or member 118 is configured so the proprioceptive shaver 100 provides users with increased awareness of the position and movement of the parts of the body by means of sensory organs (proprioceptors) in the muscles and joints controlling the movement of the blade cartridge 152. Accordingly, the proprioceptive shaver 100 is configured to provide multiple, preferably three, points of contact on two fingers of the same hand. The three points of contact include areas at or near the metacarpophalangeal joint 50, proximal interphalangeal joint 52, and distal inferior phalanges (fingertips) 54 of the user's hand (as illustrated in FIG. 14). More specifically, the three points of contact include:

1. The area directly underneath the metacarpophalangeal joint of two fingers of the same hand;
2. The area just distal to the metacarpophalangeal joint and proximal to the proximal interphalangeal joint which acts as a fulcrum with no finger contact until #3; and
3. The distal inferior phalanges (fingertips) 54 of the same two fingers on the same hand, which is connected to #2 for consistency by a flexible adjustable shaft (to be described later).

As a result, a unique leverage is created between the metacarpophalangeal joint and the distal two inferior phalanges (fingertips) on the same hand. This unique and exaggerated leverage creates an increased proprioception and awareness of the position and movement of the razor while it is being moved across intimate skin. This increased proprioception of the razor blades allows for a much safer intimate grooming experience in areas that are difficult to shave safely.

The user engagement portion or member 118 may include a first portion or member 176 (also referred to as an upper portion or member, referring to positioning on an anterior (back or dorsal side) surface of a finger), a second portion or member 178 (also referred to as a lower portion or member referring to positioning on a posterior (palmer side) surface of a finger), and a bridge body 180 separating the first (upper) member 176 and the second (lower) member 178. The first member 176 and the second member 178 are preferably arranged so that portions of each component may be oriented in either a perpendicular or parallel, or generally perpendicular or parallel arrangement, and together forming a first opening 182 (to the left of bridge 180, see FIG. 18) and a second opening 183 (to the right of bridge 180, see FIG. 18). The first opening 182 has a center axis that is parallel to a longitudinal axis of the main body 112. The second opening has a center that is parallel to the longitudinal axis of the main body 112.

Figure 26:
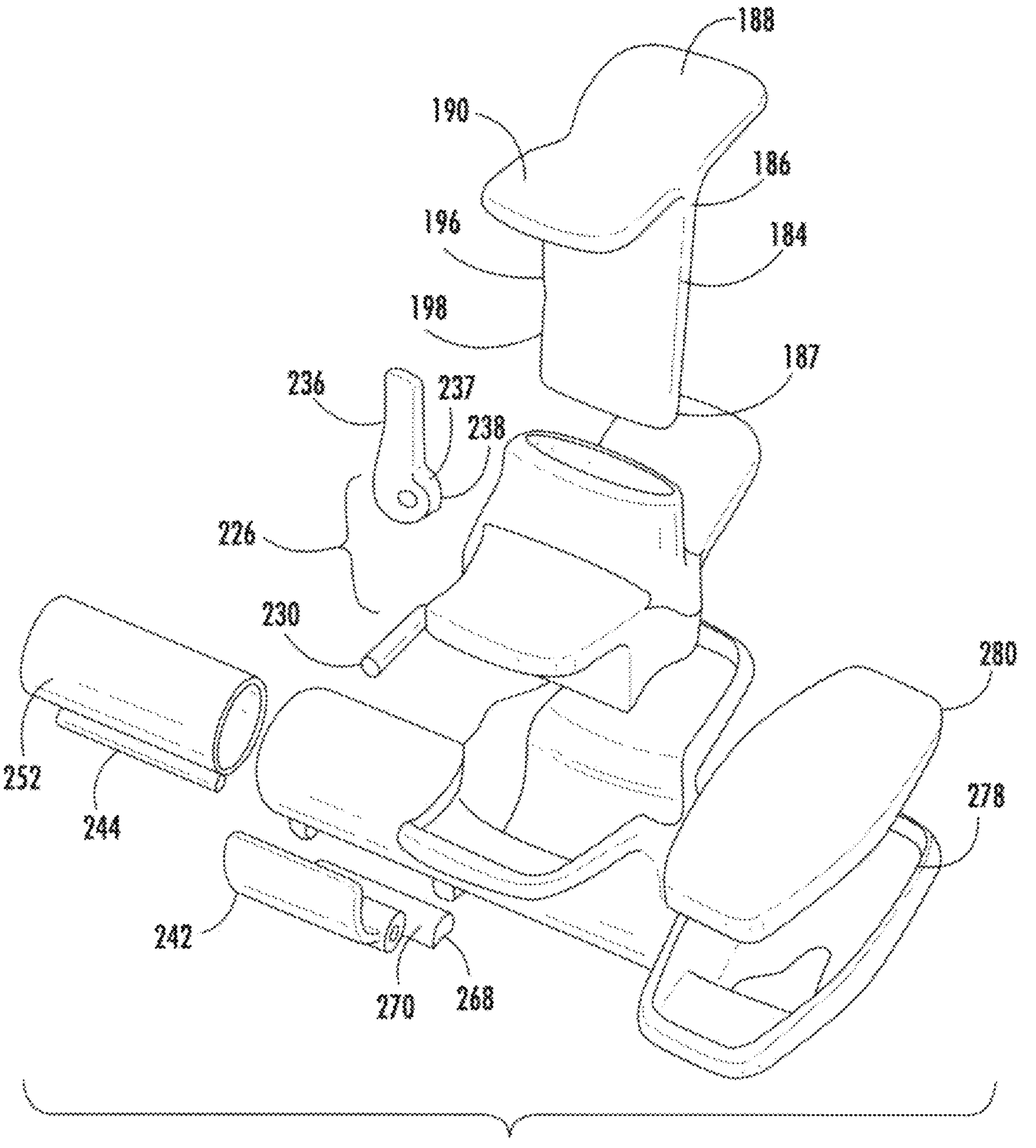
FIG. 26 is an alternative perspective view of the user engagement member of the proprioceptive shaver illustrated in FIG. 16.
Figure 27:
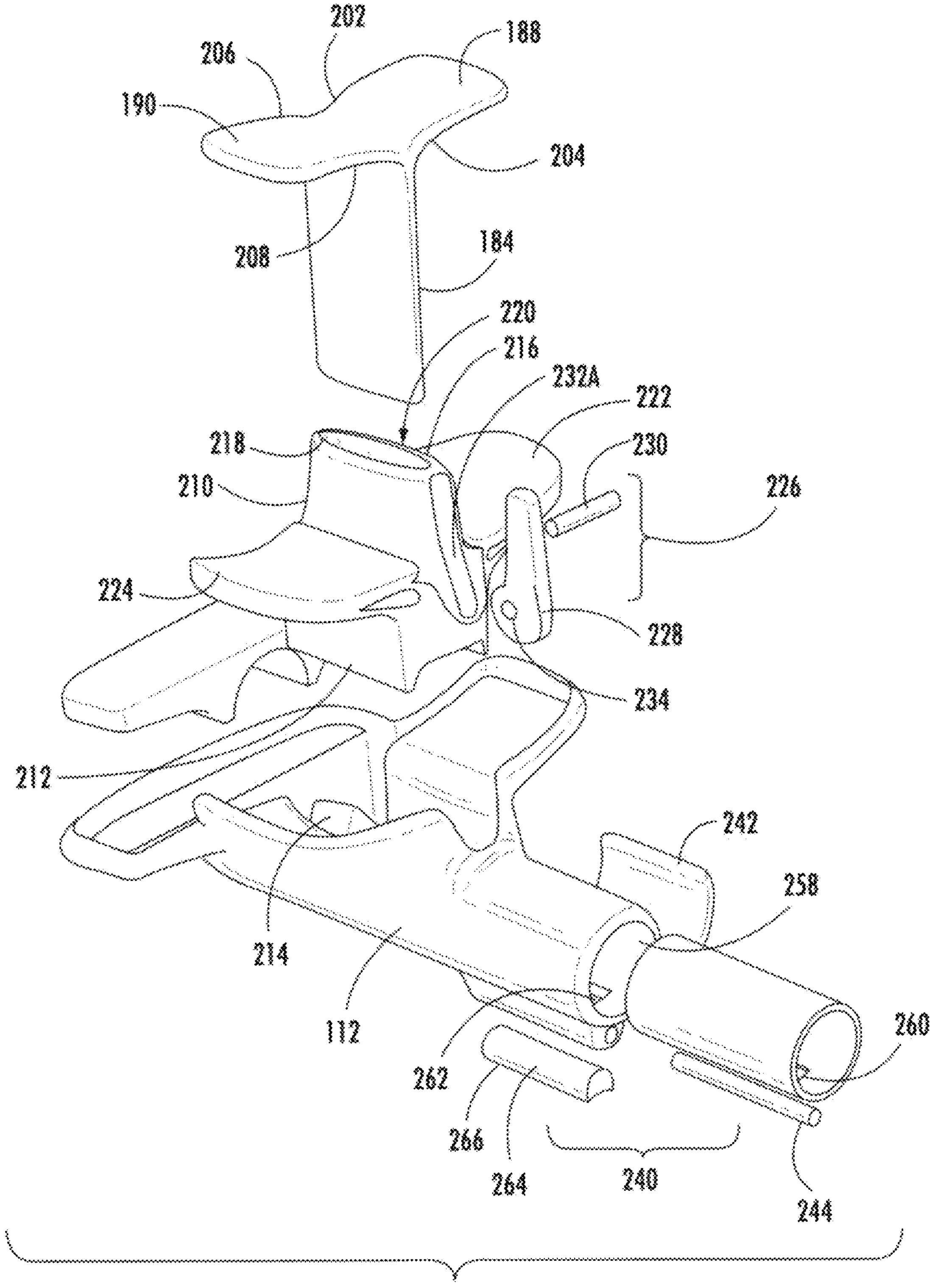
FIG. 27 is an alternative perspective view of the user engagement member of the proprioceptive shaver illustrated in FIG. 16.

The user engagement portion first member 176 includes a vertical body 184 having a first end 186 and an opposing second end 187 (see FIG. 26). The first end 186 includes two flange members, first flange member 188 and second flange member 190. The first flange member 188 and the second flange member 190 may be integrally formed from the vertical body 184, or attached and secured thereto. The first flange member 188 extends out and is orientated away from the vertical body 184 in a first direction. The second flange member 190 extends out and is orientated away from the vertical body 184 in a second direction, where the second direction is different than the first direction. The structural arrangement of the vertical body 184 with the first flange member 188 and the second flange member 190 forming, generally, a T-shape.

Figure 25:
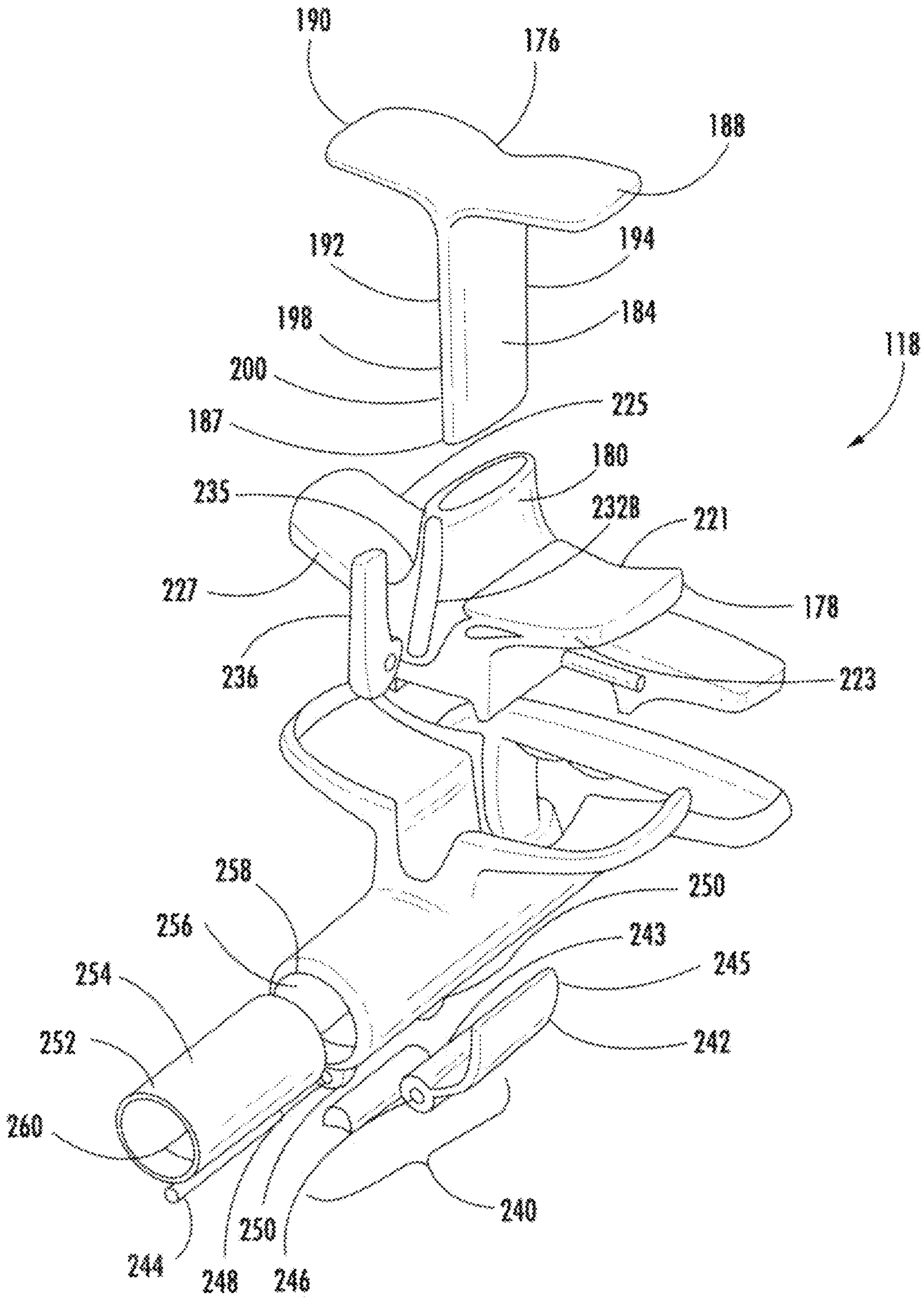
FIG. 25 is a perspective view of the user engagement member of the proprioceptive shaver illustrated in FIG. 16.

The vertical body 184 may include an inner side wall or surface 192 and an opposing, outer side wall or surface 194 (FIG. 25). The inner side wall or surface 192 may comprise an inwardly slanted or angled surface 196 (FIG. 26). The inwardly slanted or angled surface 196 terminates in a recessed section 198 defining a cam receiving area or surface 200. The vertical body 184 is sized and shaped to fit, and move within a section of the second member 178 of the user engagement member 118 via insertion within the bridge 180.

The first flange member 188 may be defined by curved surfaces 202, 204 (FIG. 27) defining the shape of the upper end of the first opening 182. The second flange member 190 may be defined by curved surfaces 206, 208 defining the shape of the upper end of the second opening 183. Alternatively, the first flange member 188 and the second flange member 190 may be defined by linear or generally linear surfaces.

Accordingly, the first flange member 188 and the second flange member 190 may have a partial curvature and extend down towards the first horizontal body 222 and the second horizontal body 224, but do not touch, thus forming the open or partial ring configuration for finger openings 182 and 183. Alternatively, finger openings 182 and 183 may be formed by the contacting of the first flange member 188 and the second flange member 190 with the first horizontal body 222 and the second horizontal body 224 (of the user engagement portion second member body 210, described below), thus forming closed ring structures.

The user engagement portion second member 178 comprises a body 210 sized and shaped to engage with and secure to the proprioceptive shaver body 112. Alternatively, the body 210 may be integrally formed from the proprioceptive shaver body 112. The user engagement portion second member body 210 comprises a lower body section 212 sized and shaped to fit and secure within an interior section 214 of the proprioceptive shaver body 112. Once placed within, the user engagement portion second member body 210 is prevented from moving side to side or up and down. The bridge 180, which may form part of the engagement portion second member body 210, further comprises an elongated vertical body 216 having an opening 218, exposing an interior 220. The opening 218 is sized and shaped to receive the user engagement portion first member vertical body 184 (this allowing a portion of the first member 176, i.e. the user engagement portion first member vertical body 184, to be oriented in a perpendicular or generally perpendicular arrangement relative to the second member 178). The interior 220 is of sufficient size and shape to allow at least a portion of the user engagement portion first member vertical body 184 to fit and move up and down when inserted therein.

Extending out from the user engagement portion second member body 210 is a pair of wings, or horizontal bodies (relative to the bridge 180), first horizontal body 222 and second horizontal body 224. The first horizontal body 222 is oriented to extend from the user engagement portion second member body 210 in a first direction. The second horizontal body 224 is oriented to extend from the user engagement portion second member body 210 in a second direction, the first direction being different than the second direction. The first horizontal body 222 and the second horizontal body 224 may be arranged to assume a parallel, or generally parallel orientation with the first flange member 188 and the second flange member 190 of the user engagement portion first member 176.

The first horizontal body 222 may be defined by upwardly curved surfaces or sections 221, 223 defining the shape of the lower end of the first opening 182. The second horizontal body 224 may be defined by curved surfaces 225, 227, defining the shape of the lower end of the second opening 183. Alternatively, the first horizontal body 222 and the second horizontal body 224 may be defined by linear or generally linear surfaces.

Figure 28:
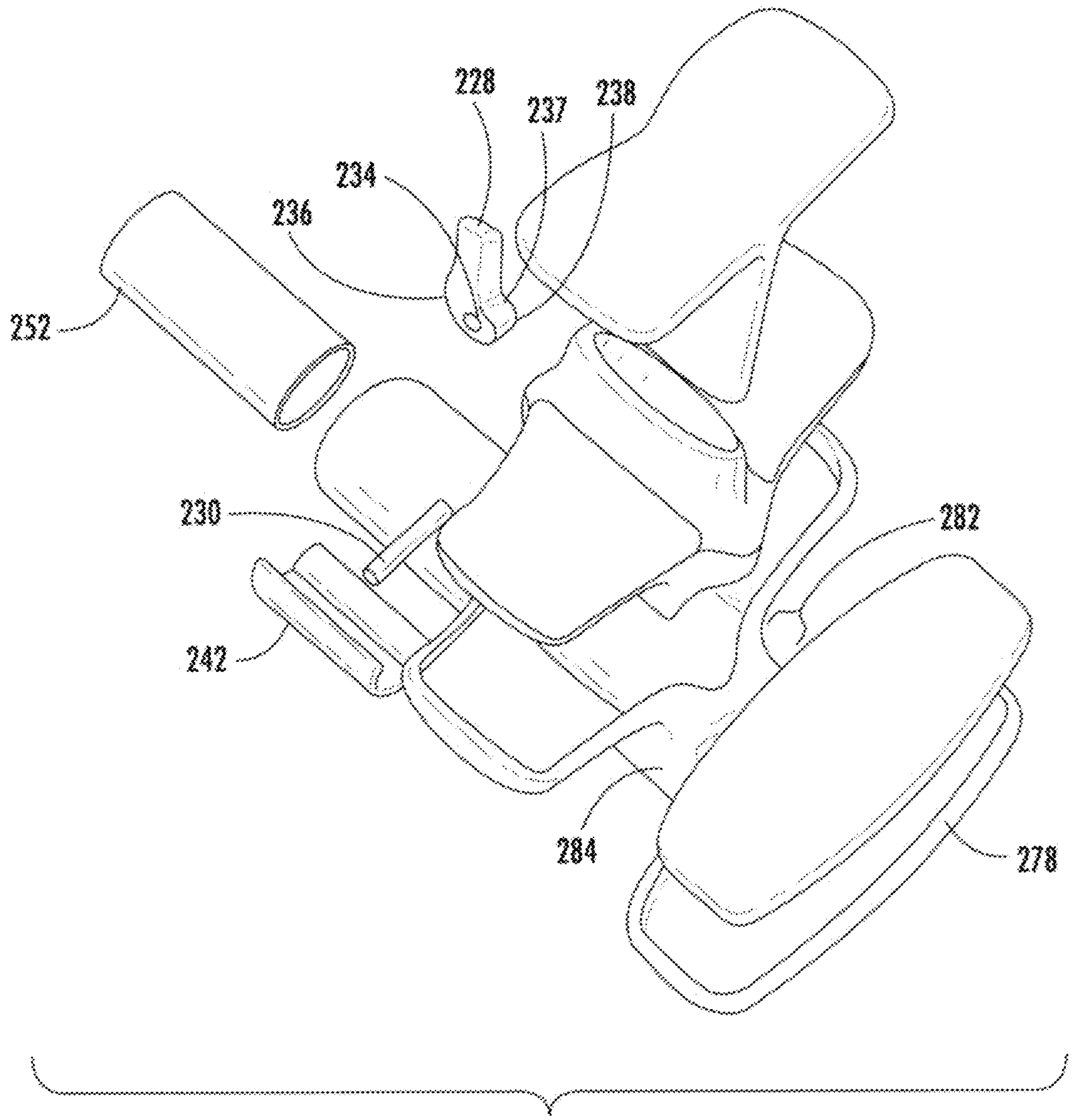
FIG. 28 is an alternative perspective view of the user engagement member of the proprioceptive shaver illustrated in FIG. 16.

To move or maintain the user engagement portion first member body 184 within the user engagement portion second member body 210, the user engagement portion second member 178 may include a first locking assembly, referred to generally as a vertical member locking assembly 226. The vertical member locking assembly 226 includes a locking assembly body 228 pivotably held in place via a pin or rod 230. Rotating the locking assembly body about the pin or rod 230 allows the user to release or lock the vertical locking assembly body 228 from/to the user engagement portion first member body 184. The pin or rod 230 extends through user engagement portion second member body openings 232A (FIG. 27) and 232B (FIG. 25), and a locking assembly body opening 234 (FIG. 28). The vertical locking assembly body 228 includes an elongated portion 236 sized and shaped to fit within a correspondingly shaped channel 235 formed within a side of the bridge 180. The locking assembly body 228 may also include a protuberance 237, forming a cam surface 238 that engages with the cam receiving area or surface 200 of the user engagement portion first member body 184 to lock the user engagement portion first member body 184 in position.

To move or maintain the shaving assembly 120 within the proprioceptive shaver body 112, the proprioceptive shaver body 112 may include a second locking assembly, referred to generally as a horizontal locking assembly 240 (FIG. 25). The horizontal locking assembly 240 includes a locking lever 242 having a cylindrical body 243 and a curved winged wall 245. The locking lever 242 rotates about a pin or rod 244 for "opening" or "closing" the horizontal locking assembly 240 (traversing or moving between the two positions). The pin or rod 244 is inserted within openings 246 at each end of the locking lever 242. The pin or rod 244 is also inserted within opening 248 of rod holders 250. An inner sleeve 252 having a cylindrical body 254 fits within an interior 256 of the proprioceptive shaver body 112 at opening 258. The inner sleeve body 254 comprises an opening 260. When the inner sleeve 252 is inserted into the interior 256 of the proprioceptive shaver body 112, the opening 260 is aligned with a bottom positioned proprioceptive shaver body opening 262. The size and shape of openings 260 and 262 are preferably complementary. A locking member 264 (FIG. 27) having a body 266 is sized and shaped to fit within the opening 260 or opening 262. The bottom surface 268 of the locking member body 266 has a complementary shape as that of the locking lever cylindrical body 243 and rests or is placed thereon. An upper surface 270 (FIG. 26) of the locking member body 266 is shaped to interact with the shaving assembly body 122. Specifically, the locking member body upper surface 270 is sized and shaped to engage with, by fitting within, a bottom channel 272 with opening 273 of the shaving assembly body 122, see FIG. 19 and FIG. 21, thus acting as a cam surface.

Figure 29:
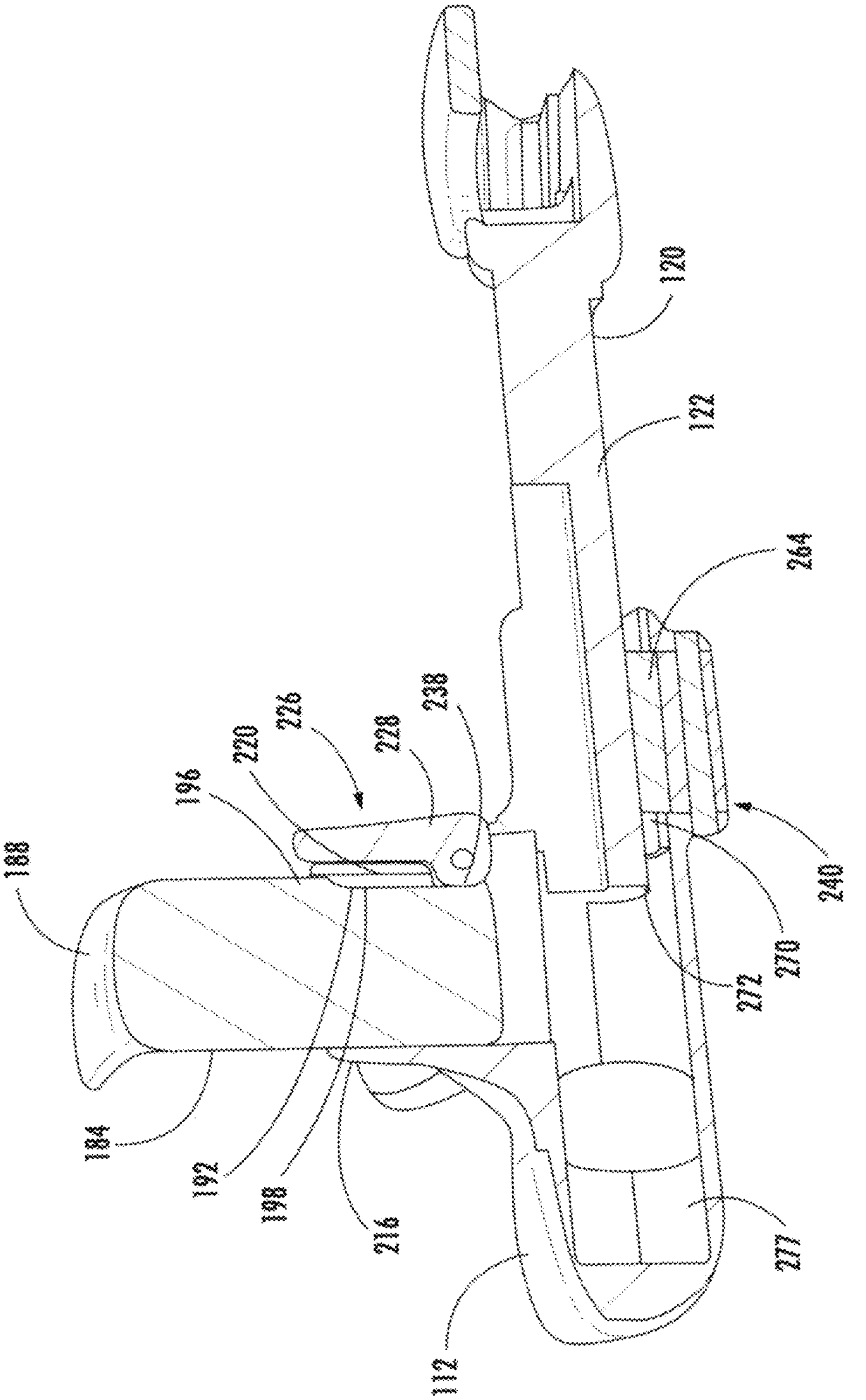
FIG. 29 is a cross-sectional view of the proprioceptive shaver illustrated in FIG. 16, illustrating the vertical member locking assembly and the horizontal member locking assembly in the closed position.

Referring to FIGS. 29-32, cross-sectional views of the proprioceptive shaver 100 are shown, illustrating the vertical locking assembly 226 or the horizontal locking assembly 240 in use. FIG. 29 illustrates the vertical locking assembly 226 in the closed (locked) position, with the user engagement portion first member vertical body 184 oriented in the highest position. In the locked position, the cam surface 238 of the vertical locking assembly body 228 contacts and pushes against the user engagement portion first member vertical body 184 (contacting recessed section 198 of inner side wall or surface 192). The horizontal locking assembly 240 is in the closed (locked) position, with the shaving assembly 120 extending out at its farthest distance. In this position, the upper surface 270 of the locking member body 266 contacts and pushes up against the shaving assembly body 122 (via the bottom channel or opening 272).

Figure 30:
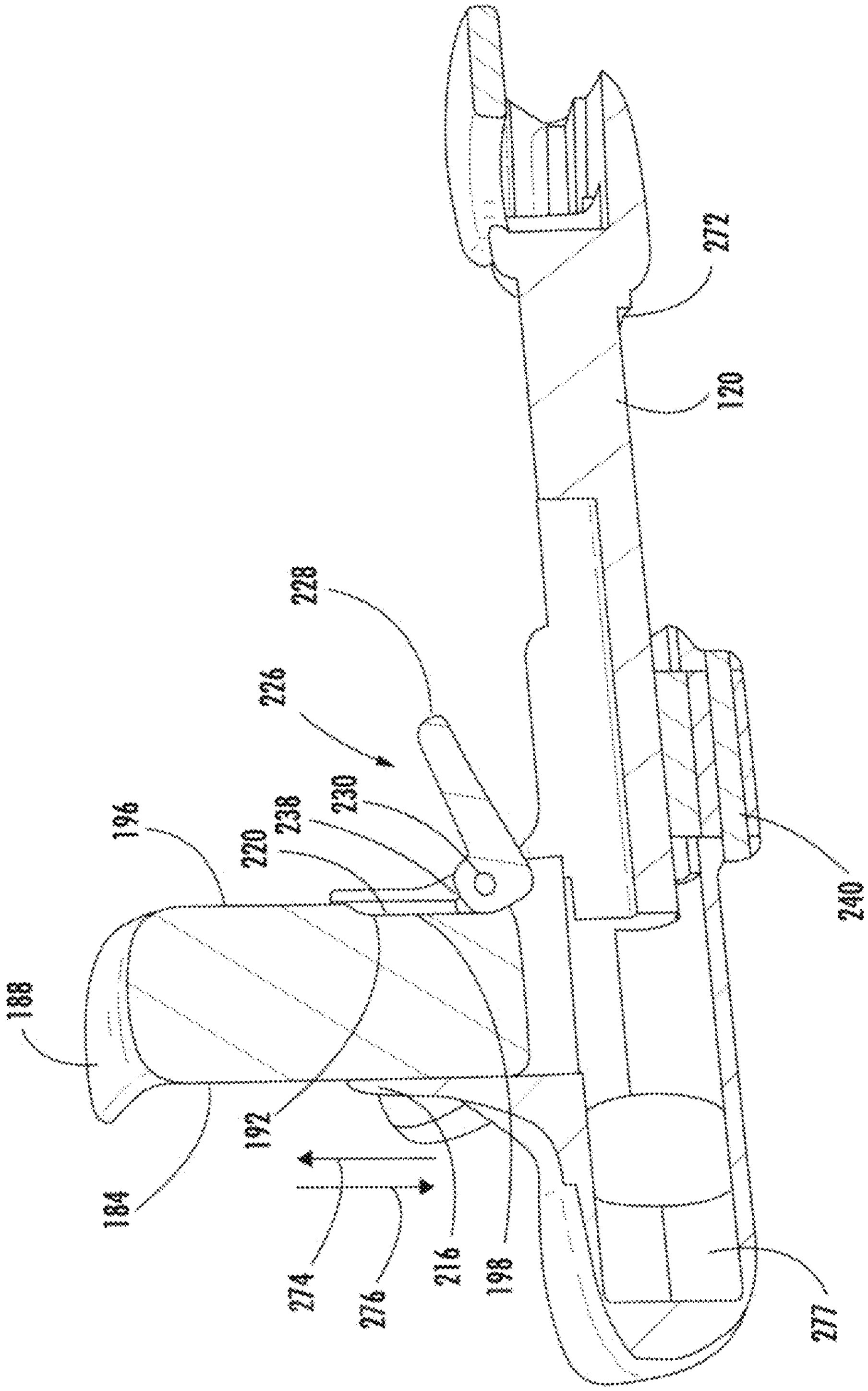
FIG. 30 is a cross-sectional view of the proprioceptive shaver illustrated in FIG. 16, illustrating the vertical member locking assembly in an open position and the horizontal member locking assembly in the closed position.

FIG. 30 illustrates the vertical locking assembly 226 in the open (unlocked) position, with the user engagement portion first member vertical body 184 oriented in the highest position. The vertical locking assembly body 228 is rotated or pivoted about rod 230. In this position, the vertical locking assembly body 228 is no longer in contact with the user engagement portion first member vertical body 184 (releasing the cam surface 238 contact). This allows the user engagement portion first member vertical body 184 to be repositioned, i.e. moved up (arrow 274) or moved down (arrow 276) within the vertical body 216, through the opening 218, and within the interior 220. Once in the proper location, the user returns the vertical locking assembly body 228 to a locked position by rotating the vertical locking assembly body 228 about the rod 230.

Figure 31:
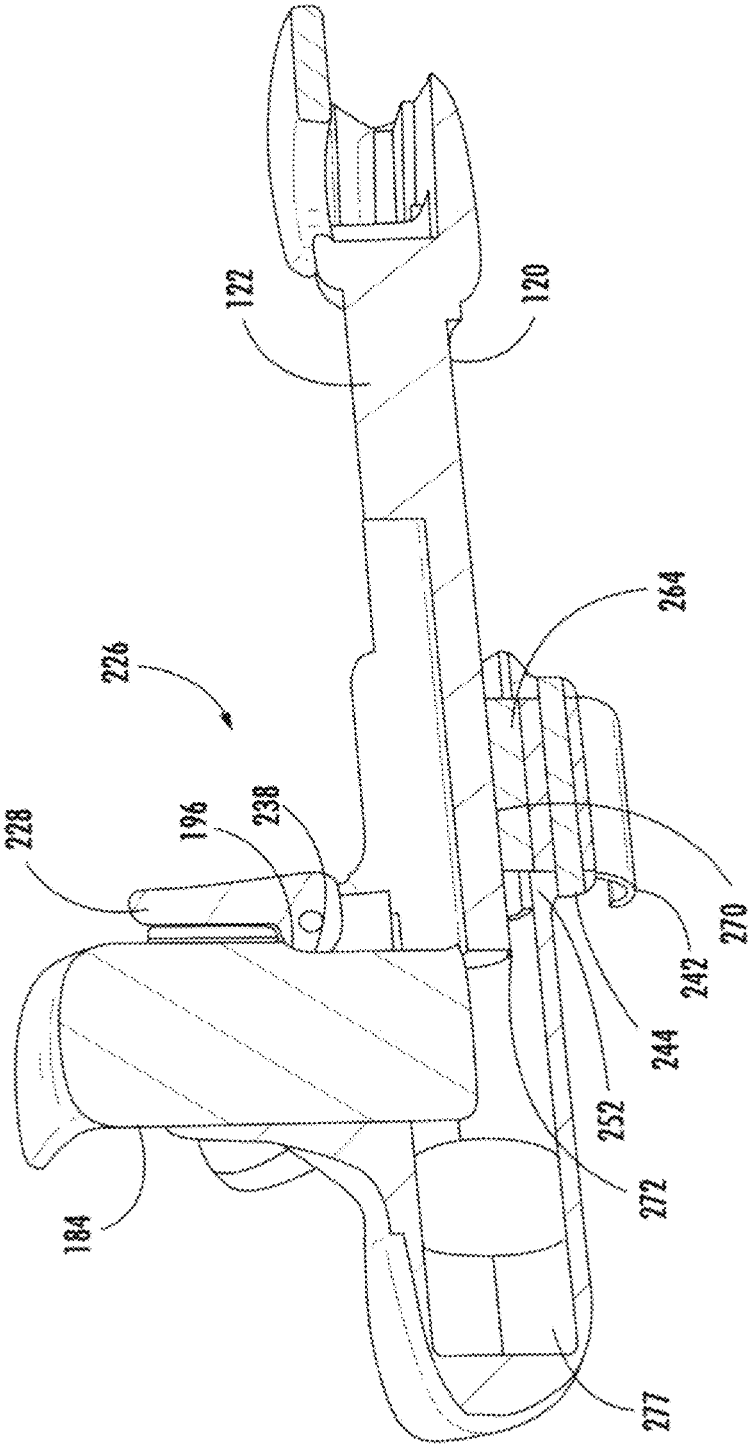
FIG. 31 is a cross-sectional view of the proprioceptive shaver illustrated in FIG. 16, illustrating the vertical member locking assembly in a closed position and the horizontal member locking assembly in the open position.

FIG. 31 illustrates the vertical locking assembly 226 in the closed (locked) position, with the user engagement portion first member vertical body 184 positioned in the lowest position. In the locked position, the cam surface 238 of the vertical locking assembly body 228 contacts and pushes against the user engagement portion first member vertical body 184 at the inwardly slanted or angled surface 196 (acting as a stop to prevent lower movement). The horizontal member locking assembly 240 is in the open (unlocked) position, with the shaving assembly 120 extending out in its farthest distance. In the open position, the locking lever 242 is rotated or pivoted about the pin or rod 244 and the upper surface 270 of the locking member body 264 no longer contacts or pushes up against the shaving assembly body 122 (bottom channel or opening 272).

Figure 32:
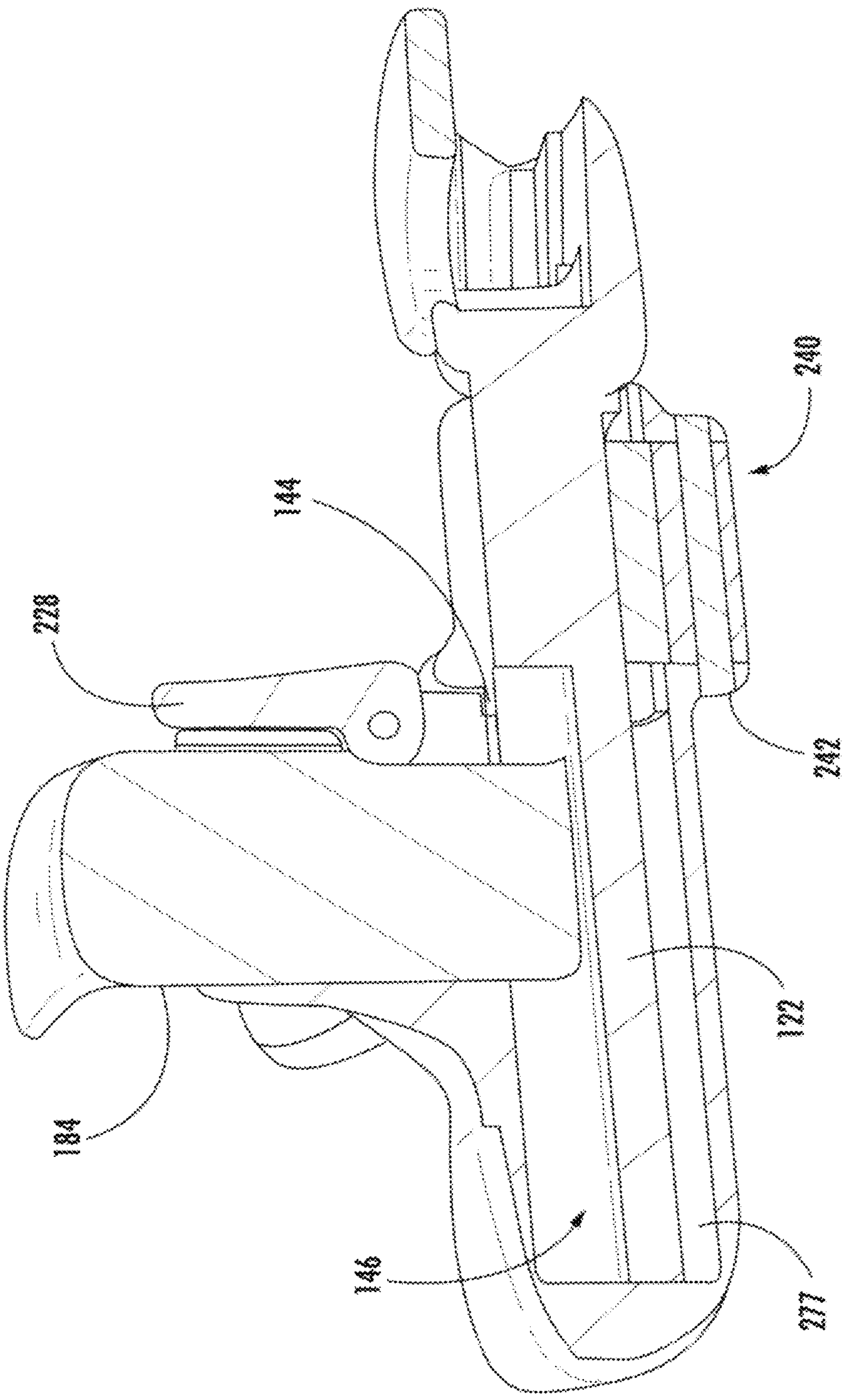
FIG. 32 is a cross-sectional view of the proprioceptive shaver illustrated in FIG. 16, illustrating the vertical member locking assembly and the horizontal member locking assembly in the closed position.

FIG. 32 illustrates the horizontal member locking assembly 240 in the closed (locked) position, with the shaving assembly 120 assuming its smallest position, i.e. the shaving assembly body 122 is positioned as far inward within the interior 277 of the proprioceptive shaver 100. In this orientation, the user engagement portion first member vertical body 118 is positioned within the shaving assembly body channel 146 via insertion within the slotted opening 144.

Positioned away from the user engagement member first member 176 and user engagement member second member 178 is a leverage bar 278 with a leverage bar cover 280 (see FIG. 26). The leverage bar cover 280 provides a surface or flat structure for receiving and retaining a portion of a user's hand. The leverage bar 278 may be integrally formed from the proprioceptive shaver body 112. Alternatively, the leverage bar 280 is attached to or separated from the proprioceptive shaver body 112 by a distance 282 via an intermediate member 284, illustrated herein as an elongated section or body. The intermediate member 284 positions the leverage bar 278 away from the proprioceptive shaver body 112, orientating the leverage bar 278 so it 1) is parallel or generally parallel to the first member 176 and the second member 178, and 2) when in use, rests in the area directly underneath the metacarpophalangeal joint of two fingers of the same hand. Accordingly, the size (and shape) of the leverage bar 278 must be sufficient to rest and/or span in the area directly underneath the metacarpophalangeal joint of two fingers of the same hand. The distance 282 must be sufficient, so when in use (placed on two fingers), the first member 176 and the second member 178 align with or rests at the area just distal to the metacarpophalangeal joint and proximal to the proximal interphalangeal joint, acting as a fulcrum with no finger contact until distal inferior phalanges (fingertips) of the same two fingers on the same hand contact the razor head 24.

All patents and publications mentioned in this specification are indicative of the levels of those skilled in the art to which the invention pertains.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A proprioceptive shaver for shaving one or more portions of a body comprising:

a main body having a first end and a second, opposing end, and arranged in a perpendicular orientation relative to a user engagement member;

said user engagement member comprising a first opening constructed and arranged to receive a first finger of a user's hand and a second opening constructed and arranged to receive a second finger, said first opening having a center axis that is parallel to a longitudinal axis of said main body, said second opening having a center axis that is parallel to said main body longitudinal axis, said main body and said user engagement member are constructed and arranged for height adjustment of said first opening and said second opening; and a shaving assembly extending from said second end of said main body and comprising a non-cutting surface for engaging ends of said first finger and said second finger when said fingers are in said openings thereby providing points of contact with the said user's hand and a cutting surface, said main body and said shaving assembly are constructed and arranged for length adjustment of said shaving assembly extending from said main body; and a leverage bar extending from said first end of said main body, said leverage bar for engaging said user's hand when said fingers are in said openings thereby providing points of contact with the said user's hand.

2. The proprioceptive shaver for shaving one or more portions of a body according to claim 1, further including, a vertical locking assembly constructed and arranged to engage with said user engagement member; and a horizontal locking assembly constructed and arranged to engage with said main body and said shaving assembly.

3. The proprioceptive shaver for shaving one or more portions of a body according to claim 2, wherein said vertical locking assembly comprises:

a locking assembly body pivotably connected to a lower portion of said user engagement member via a rod, said locking body comprising a locking surface configured to engage with a surface of an upper portion of said user engagement member when in a locked position.

4. The proprioceptive shaver for shaving one or more portions of a body according to claim 2, wherein said horizontal locking assembly comprises:

a locking lever pivotably connected to said main body via a rod for traversing said horizontal locking assembly from a locked position to an unlocked position or from an unlocked position to a locked position; and a locking body operatively connected to said locking lever, said locking body having a cam locking surface constructed and arranged to engage with said shaving assembly when said locking lever is rotated to said locking position.

5. The proprioceptive shaver for shaving one or more portions of a body according to claim 1, wherein said cutting surface includes one or more razor blades.

6. The proprioceptive shaver for shaving one or more portions of a body according to claim 1, wherein said shaving assembly includes a removable cartridge defining said non-cutting surface and said cutting surface, said cutting surface having one or more razor blades.

7. The proprioceptive shaver for shaving one or more portions of a body according to claim 1, wherein said leverage bar has a surface for contact of an area underneath the metacarpophalangeal joint of said first finger or said second finger of said user's hand.

8. The proprioceptive shaver for shaving one or more portions of a body according to claim 1, wherein an upper portion and a lower portion of said user engagement member provides for said height adjustment, said upper portion partially defining said first and second openings, and configured to engage with back or dorsal side surfaces of said first finger and said second finger of said user's hand when in use, and said lower portion partially defining said first and second openings, and configured to engage with palmer surfaces of said first finger and said second finger of said user's hand when said fingers are in said openings.

9. The proprioceptive shaver for shaving one or more portions of a body according to claim 1, wherein said first opening and said second opening are formed as two partially open ring-shaped structures.

10. The proprioceptive shaver for shaving one or more portions of a body according to claim 1, wherein said shaving assembly further comprises a shaft extending from said second end, said shaft configured to be movable relative to said main body, thereby providing for said length adjustment of said shaving assembly.

11. The proprioceptive shaver for shaving one or more portions of a body according to claim 10, wherein said shaving assembly shaft is sized and shaped to fit and move within an interior region of said main body.

12. The proprioceptive shaver for shaving one or more portions of a body according to claim 1, wherein said shaving assembly is positioned at an angle relative to said main body.

13. The proprioceptive shaver for shaving one or more portions of a body according to claim 1, wherein an upper portion and a lower portion of said user engagement member provides for said height adjustment, said upper portion partially defining said first and second openings, and configured to engage with back or dorsal side surfaces of said first finger and said second finger of said user's hand when in use, and said lower portion partially defining said first and second openings, and configured to engage with palmer surfaces of said first finger and said second finger of said user's hand when said fingers are in said openings.

14. A proprioceptive shaver for shaving one or more portions of a body comprising:

a user engagement member comprising a first opening and a second opening;

a main body extending in a perpendicular direction from said user engagement member, and having a first end, a second, opposing end, and an interior passageway, said main body having a longitudinal axis arranged in a parallel orientation relative to a center axis of said first opening and a center axis of said second opening, said main body and said user engagement member are constructed and arranged for height adjustment of said first opening and said second opening;

a shaving assembly comprising an elongated shaft terminating in a non-cutting surface for engaging ends of said first finger and said second finger when said fingers are in said openings, said elongated shaft inserted within said interior passageway, with said non-cutting surface extending out from said interior passageway and said second end to allow a distal inferior phalange of a first finger of a user's hand and a distal inferior phalange of a second finger of said user's hand to rest on said non-cutting surface when in use; and a leverage body positioned on said first end of said main body, said leverage bar for engaging said user's hand when said fingers are in said openings;

wherein, when placed on said user's hand wherein said user's first finger is inserted within said first opening and a distal inferior phalange of said first finger rests on said non-cutting surface and said user's second finger is inserted within said second opening and a distal inferior phalange of said second finger rests on said non-cutting surface, said proprioceptive shaver simultaneously contacts multiple areas of said user's hand.

15. The proprioceptive shaver for shaving one or more portions of a body according to claim 14, wherein said shaving assembly comprises a shaving cartridge engaged with said shaving assembly elongated shaft, said shaving cartridge having at least one cutting surface.

16. The proprioceptive shaver for shaving one or more portions of a body according to claim 15, wherein said shaving cartridge is releasably attached to said shaving assembly elongated shaft.

17. The proprioceptive shaver for shaving one or more portions of a body according to claim 14, wherein said leverage body has a surface for contact of an area underneath a metacarpophalangeal joint of said first finger or said second finger of said user's hand, or combinations thereof.

18. The proprioceptive shaver for shaving one or more portions of a body according to claim 14, further including, a vertical locking assembly constructed and arranged to engage with said user engagement member; and a horizontal locking assembly constructed and arranged to engage with said main body and said user shaving assembly.

19. The proprioceptive shaver for shaving one or more portions of a body according to claim 9, wherein said vertical locking assembly comprises:

a locking assembly body pivotably connected to a lower portion of said user engagement member via a rod, said locking body comprising a locking surface configured to engage with a surface of an upper portion of said user engagement member when in a locked position.

20. The proprioceptive shaver for shaving one or more portions of a body according to claim 18, wherein said horizontal locking assembly comprises:

a locking lever pivotably connected to said main body via a rod for traversing said horizontal locking assembly from a locked position to an unlocked position or from an unlocked position to a locked position; and a locking body operatively connected to said locking lever, said locking body having a cam locking surface constructed and arranged to engage with said shaving assembly when said locking lever is rotated to said locking positon.

* * * * *